(12) United States Patent
Toda

(10) Patent No.: US 8,107,111 B2
(45) Date of Patent: Jan. 31, 2012

(54) PRINT PROCESSING SYSTEM, INFORMATION PROCESSING APPARATUS, IMAGE FORMING APPARATUS, CONTROL METHOD THEREFOR, AND PROGRAM

(75) Inventor: Masanari Toda, Yokohama (JP)

(73) Assignee: Canon Kabushiki Kaisha (JP)

( * ) Notice: Subject to any disclaimer, the term of this patent is extended or adjusted under 35 U.S.C. 154(b) by 624 days.

(21) Appl. No.: 12/339,795

(22) Filed: Dec. 19, 2008

(65) Prior Publication Data

US 2009/0168096 A1    Jul. 2, 2009

(30) Foreign Application Priority Data

Dec. 26, 2007 (JP) .................................. 2007-335060

(51) Int. Cl.
*G06F 15/00* (2006.01)
*G06F 3/12* (2006.01)
*H04N 1/60* (2006.01)
(52) U.S. Cl. .......................... 358/1.15; 358/1.6; 358/1.9
(58) Field of Classification Search .................. 358/1.15, 358/1.6, 1.9, 471, 444, 468, 434, 435, 436
See application file for complete search history.

(56) References Cited

U.S. PATENT DOCUMENTS

| 5,608,910 | A | * | 3/1997 | Shimakura | 718/100 |
| 7,847,958 | B2 | * | 12/2010 | Ishikura | 358/1.14 |
| 2007/0016962 | A1 | * | 1/2007 | Ishikura | 726/31 |
| 2007/0174204 | A1 | * | 7/2007 | Pae et al. | 705/59 |
| 2008/0130434 | A1 | * | 6/2008 | Morimoto | 369/47.14 |

FOREIGN PATENT DOCUMENTS

| JP | 402063872 | * | 3/1990 |
| JP | 3703376 B2 | | 7/2005 |

* cited by examiner

*Primary Examiner* — Jerome Grant, II
(74) *Attorney, Agent, or Firm* — Rossi, Kimms & McDowell LLP

(57) ABSTRACT

It is determined whether device information having an ID coincident with that of device information included in the print settings of received print data exists. If it is determined that the device information having the ID coincident with that of the device information included in the print settings exists, print processing is executed for the received print data in accordance with the ID-added device information and print settings. If it is determined that the device information having the ID coincident with that of the device information included in the print settings does not exist, paper type information set in the print settings is displayed.

10 Claims, 18 Drawing Sheets

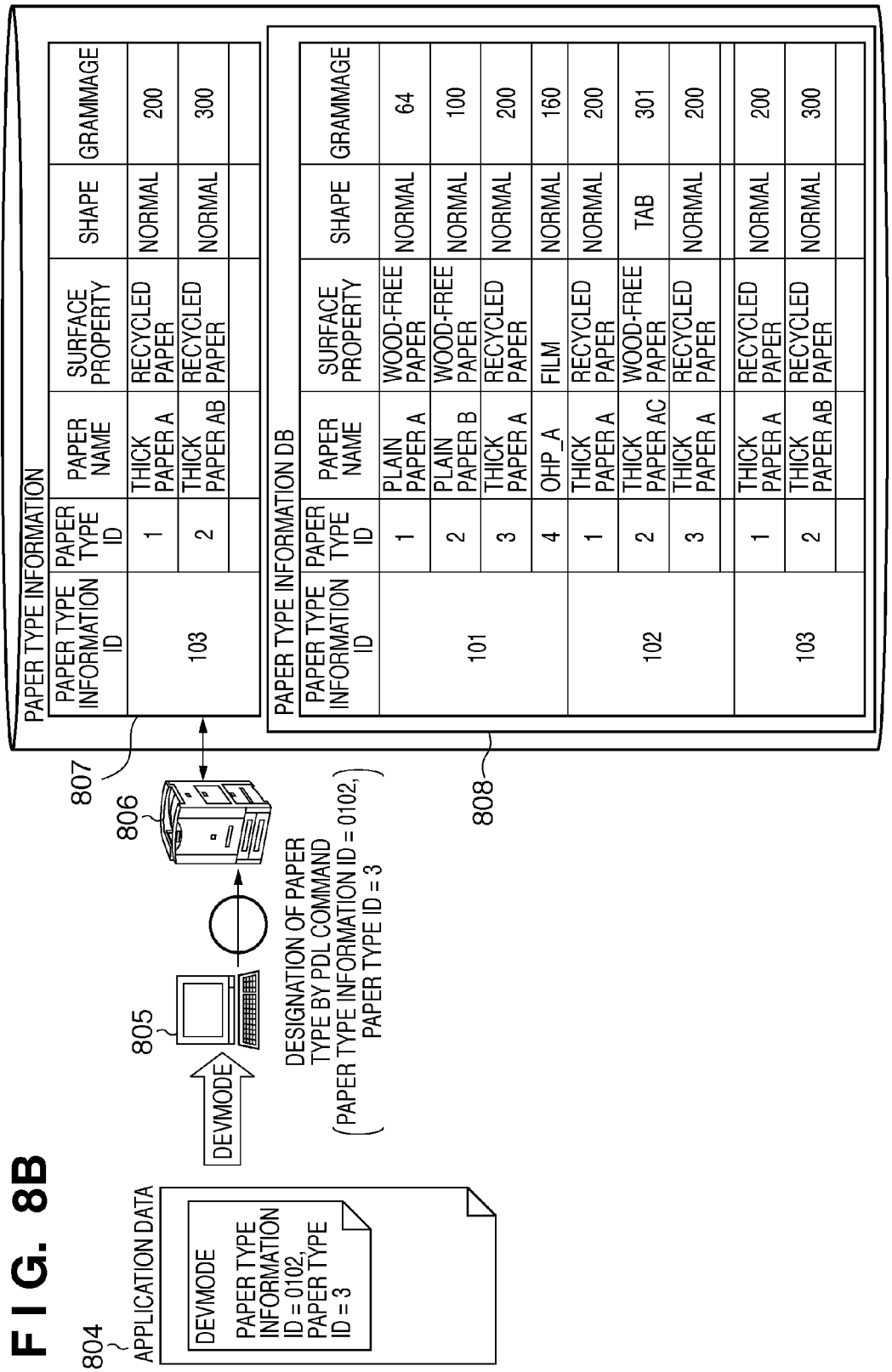

| PAPER TYPE INFORMATION ID | PAPER TYPE ID | PAPER NAME | SURFACE PROPERTY | SHAPE | GRAMMAGE |
|---|---|---|---|---|---|
| 102 | 1 | THICK PAPER A | RECYCLED PAPER | NORMAL | 200 |
| | 2 | THICK PAPER AC | WOOD-FREE PAPER | TAB | 301 |
| | 3 | THICK PAPER A | RECYCLED PAPER | NORMAL | 200 |
| | | | | | |

FIG. 9B

| PAPER TYPE INFORMATION ID | PAPER TYPE ID | PAPER NAME | SURFACE PROPERTY | SHAPE | GRAMMAGE |
|---|---|---|---|---|---|
| 101 | 1 | PLAIN PAPER A | WOOD-FREE PAPER | NORMAL | 64 |
| | 2 | PLAIN PAPER B | WOOD-FREE PAPER | NORMAL | 100 |
| | 3 | THICK PAPER A | RECYCLED PAPER | NORMAL | 200 |
| | 4 | OHP_A | FILM | NORMAL | 160 |
| 102 | 1 | THICK PAPER A | RECYCLED PAPER | NORMAL | 200 |
| | 2 | THICK PAPER AC | WOOD-FREE PAPER | TAB | 301 |
| | 3 | THICK PAPER A | RECYCLED PAPER | NORMAL | 200 |
| | | | | | |

FIG. 14

| PAPER SETTINGS | | | | | |
|---|---|---|---|---|---|
| PAPER DISPLAYED(P): | ALL ▼ | | | | |
| PAPER TYPE (T): | | | | | |
| NAME | | TYPE | GRAMMAGE | SURFACE PROPERTY | SHAPE |
| ☐ RECYCLED PAPER 1 (64~79g/m²) | | STANDARD PAPER | — | RECYCLED PAPER | NORMAL |
| ☐ RECYCLED PAPER 2 (80~105g/m²) | | STANDARD PAPER | — | RECYCLED PAPER | NORMAL |
| ☐ RECYCLED PAPER 3 (151~180g/m²) | | STANDARD PAPER | — | RECYCLED PAPER | NORMAL |
| ☐ RECYCLED PAPER 4 (210~256g/m²) | | STANDARD PAPER | — | RECYCLED PAPER | NORMAL |
| ☐ COLORED PAPER (64~79g/m²) | | STANDARD PAPER | — | RECYCLED PAPER | NORMAL |
| ☐ PAPER (64~79g/m²) | | STANDARD PAPER | — | WOOD-FREE PAPER | NORMAL |
| ☐ PAPER (80~105g/m²) | | STANDARD PAPER | — | WOOD-FREE PAPER | NORMAL |
| ☐ ONE-SIDE COATED PAPER 1 (106~128g/m²) | | STANDARD PAPER | — | ONE-SIDE COATED | NORMAL |
| ☐ ONE-SIDE COATED PAPER 2 (129~150g/m²) | | STANDARD PAPER | — | ONE-SIDE COATED | NORMAL |
| ☐ ONE-SIDE COATED PAPER 3 (151~180g/m²) | | STANDARD PAPER | — | ONE-SIDE COATED | NORMAL |

[ OK ]   [ CANCEL ]   [ ACQUIRE PAPER INFORMATION (O) ]   [ HELP (H) ]

FIG. 15

| PRINT JOB HEADER |
|---|
| PAPER SELECTION METHOD |
| PAPER SELECTION MODE |
| PAPER TYPE INFORMATION |
| RENDERING DATA (PDL) |
| PRINT JOB TERMINATION |

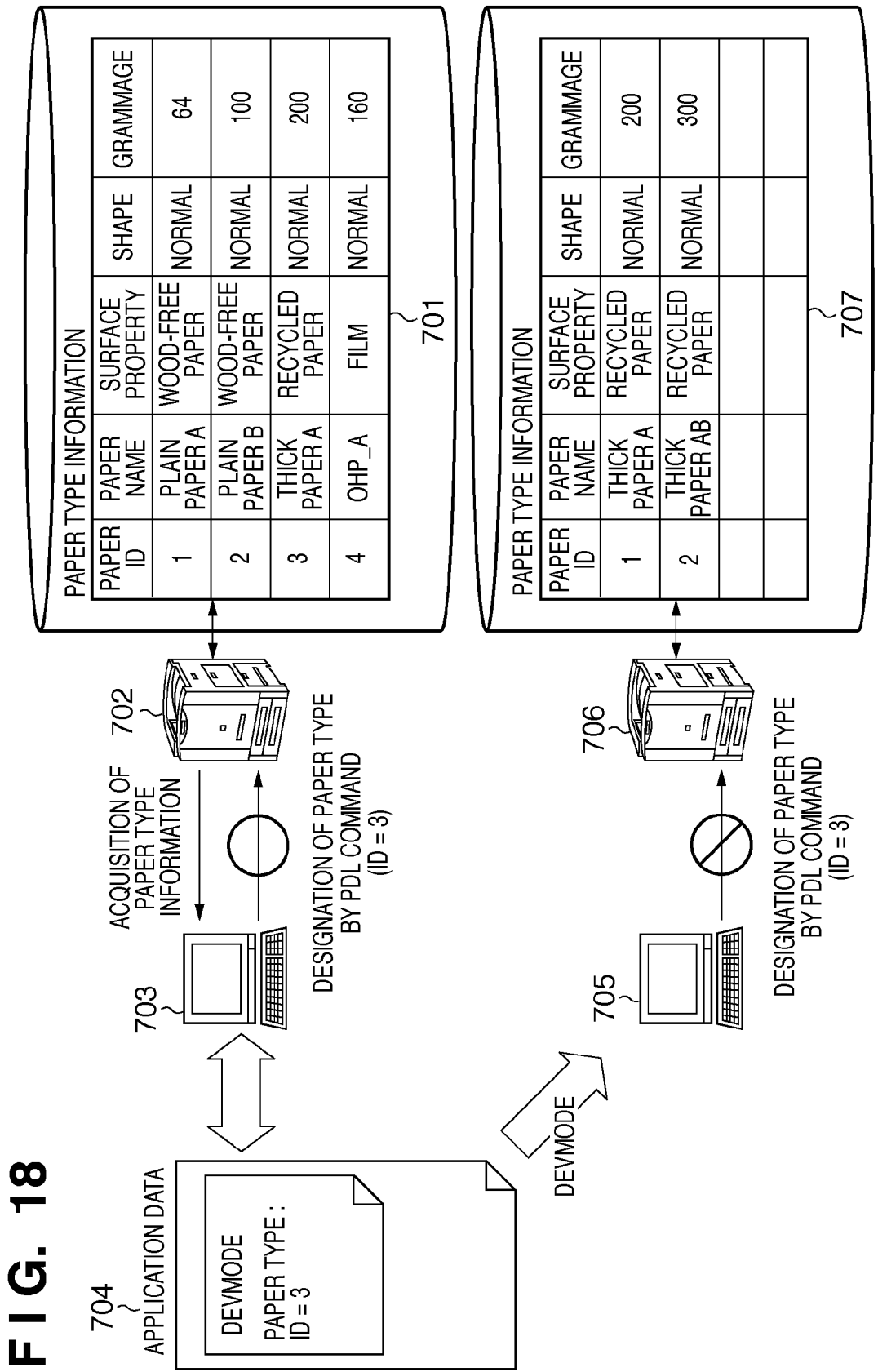

PRINT PROCESSING SYSTEM, INFORMATION PROCESSING APPARATUS, IMAGE FORMING APPARATUS, CONTROL METHOD THEREFOR, AND PROGRAM

BACKGROUND OF THE INVENTION

1. Field of the Invention

The present invention relates to a print processing system configured by connecting, via a network, an information processing apparatus which generates print data, and an image input/output apparatus which receives the print data and executes print processing. The present invention also relates to an information processing apparatus and image forming apparatus which configure the print processing system, a control method therefor, and a program.

2. Description of the Related Art

Conventionally, a printer driver installed in a host computer has a mechanism of acquiring paper type information registered in a printer from the printer via a network, and designating a paper type as a paper selection method. Paper type information of standard paper types (e.g., plain paper, thick paper, and OHP: called Type 1) can be exchanged between a device (printer) and a printer driver using a fixed ID value (paper type ID value) (Japanese Patent No. 3703376).

The setting values of a Windows®-compliant printer driver are defined by a fixed-size data structure called DEVMODE. An application on a host computer uploads printer driver setting values from a printer driver by the DEVMODE structure. When executing printing, the application transfers printer driver setting values to the printer driver by the DEVMODE structure to designate printer driver settings. The paper type is also defined as a DEVMODE member value, and a paper type ID defined as a specified paper type is used as a setting value.

These days, a Type 2 paper method has been proposed. According to this method, special paper type information (name "character string", shape, surface property, and grammage) is defined based on a specified paper type. An ID number is added to the special paper type information, and then the special paper type information is registered in a device. In a conventional print system, paper types are limited to specified ones. However, the Type 2 paper method allows the user to print with various paper types by designating Type 2 paper on a device and registering it as paper type information.

To display and select detailed information of paper type information (Type 2) on a printer driver UI, paper type information (name "character string", shape, surface property, grammage, and the like corresponding to a paper type ID) needs to be acquired from a printer.

Type 2 paper type information has a variable size larger than a Type 1 fixed ID value. However, the size of the DEVMODE for storing setting values must be fixed. An excessive increase in size of the DEVMODE decreases the processing speed of an application and makes the system unstable. Thus, no DEVMODE can ensure an excessively large size.

From this, as for Type 2 paper, a method of registering only a paper type ID value in the DEVMODE, similar to Type 1 paper, has been examined and practiced.

When an application designates a paper type ID in the DEVMODE, the printer driver generates a print instruction including the paper type ID value, and transmits it to the printer. When the paper type ID value included in the received print instruction represents Type 2, the printer refers to detailed paper type information registered in paper type information in the printer. From this information, the printer can recognize the designated paper type and execute print processing using the designated paper type.

As described above, some applications save a DEVMODE in data generated by them, and transfer data including the DEVMODE to a printer driver in printing, thereby designating print settings used to generate data. However, when the DEVMODE stores the paper type ID of a paper type (Type 2) created by a device, the following problem arises. This will be explained in detail with reference to FIG. 18.

Paper type information 701 is registered in a printer 702. In the paper type information 701, a plurality of Type 2 sheets are set. Upon receiving a request from the printer driver of a PC 703, the printer 702 transmits the paper type information 701 to the printer driver of the PC 703.

The paper type information received from the printer is displayed on the setup UI of the printer driver of the PC 703 to prompt the user to select a paper type as a print setting value. The selected print setting value is saved in a DEVMODE included in application data 704. In this example, the user selects the paper type ID=3 (paper name: thick paper A, surface property: recycled paper, shape: normal, grammage: 200) as a paper selection method among print setting values.

A case where the printer 702 prints the application data 704 will be explained.

The printer driver of the PC 703 generates a print instruction (PDL command) including a paper type designation instruction (ID=3) from the paper type ID=3 set in the DEVMODE in the application data 704 received from the application. The printer driver transmits the generated print instruction to the printer 702.

The printer 702 refers to the paper type information 701 in the paper type designation instruction included in the print instruction. In this case, paper type information of the paper type ID=3 exists in the paper type information 701. The printer 702 can execute print processing complying with the paper type information of the paper type ID=3 (normal processing system).

However, the following problem arises if the generated application data 704 is printed by a printer 706 in which the configuration of paper type information has changed (updated) from one used to generate the application data 704.

Similar to the normal processing system, a printer driver in a PC 705 transmits a print instruction including a paper type designation instruction of the paper type ID=3 to the printer 706. The contents of paper type information 707 in the printer 706 have been updated, so the paper type ID=3 does not exist in the paper type information 707.

In this state, the printer 706 cannot perform proper processing complying with the paper type because the paper type information of the paper type ID=3 does not exist in the paper type information 707. For example, for paper having the paper type ID=3 and a grammage corresponding to thick paper, the printer needs to operate at a fixing temperature higher than that for plain paper. However, no necessary information exists, so the paper is changed to plain paper to print.

If paper type information of the paper type ID=3 exists in the paper type information 707, but a value different from that used to generate the application data 704 is set in printing, a trouble which may adversely affect the printer engine of the printer 706 may also occur. As an example of this trouble, the printer engine tries to perform double-sided printing with a paper type incapable of double-sided printing.

SUMMARY OF THE INVENTION

The present invention has been made to overcome the conventional drawbacks, and has as its object to provide a print processing system, information processing apparatus, and image forming apparatus capable of appropriately executing printing complying with print settings which have already been made, a control method therefor, and a program.

According to the first aspect of the present invention, a print processing system configured by connecting, via a network, an information processing apparatus which generates print data, and an image forming apparatus which receives the print data and executes print processing, comprises: the information processing apparatus comprises first reception unit adapted to receive, via the network, ID-added device information which is set in the image forming apparatus and includes paper type information representing a current paper type, generation unit adapted to generate, as a print setting including paper type information for print data to be printed by the image forming apparatus, a print setting having an ID of the ID-added device information received by the first reception unit, and first transmission unit adapted to transmit, to the image forming apparatus via the network, print data by generating the print data including the print setting generated by the generation unit; and the image forming apparatus comprises setting unit adapted to set the ID-added device information including the paper type information, storage unit adapted to store ID-added current device information set by the setting unit, and ID-added previous device information set previously, second transmission unit adapted to transmit the ID-added current device information via the network in response to a request from the information processing apparatus, second reception unit adapted to receive print data from the information processing apparatus via the network, determination unit adapted to determine whether device information having an ID coincident with an ID of device information included in a print setting of the print data received by the second reception unit exists in the storage unit, execution unit adapted to, when the determination means determines that the device information having the ID coincident with the ID of the device information included in the print setting exists in the storage means, execute print processing for the print data received by the second reception unit in accordance with the ID-added device information and the print setting, and display unit adapted to, when the determination means determines that the device information having the ID coincident with the ID of the device information included in the print setting does not exist in the storage means, display paper type information set in the print setting.

According to the second aspect of the present invention, an information processing apparatus which generates print data to be printed by an image forming apparatus connected via a network, the information processing apparatus comprises: reception unit adapted to receive, via the network, ID-added device information which is set in the image forming apparatus and includes paper type information representing a current paper type; generation unit adapted to generate, as a print setting including paper type information for print data to be printed by the image forming apparatus, a print setting having an ID of the ID-added device information received by the reception unit; and transmission unit adapted to transmit, to the image forming apparatus, print data by generating the print data including the print setting generated by the generation unit.

In a preferred embodiment, the apparatus further comprises: acquisition unit adapted to acquire, from an application, the print setting which has already been made for application data generated by the application and has the ID of the ID-added device information received by the reception unit; and print data generation unit adapted to generate print data including the print setting acquired by the acquisition unit as print data corresponding to the application data.

In a preferred embodiment, the apparatus further comprises display unit adapted to display paper type information included in the device information received by the reception unit.

According to the third aspect of the present invention, an image forming apparatus which receives print data from an information processing apparatus connected via a network and executes print processing, the image forming apparatus comprises: setting unit adapted to set ID-added device information including paper type information representing a current paper type used for print processing; storage unit adapted to store ID-added current device information set by the setting unit, and ID-added previous device information set previously; transmission unit adapted to transmit the ID-added current device information via the network in response to a request from the information processing apparatus; reception unit adapted to receive print data from the information processing apparatus via the network; determination unit adapted to determine whether device information having an ID coincident with an ID of device information included in a print setting of the print data received by the reception unit exists in the storage unit; execution unit adapted to, when the determination means determines that the device information having the ID coincident with the ID of the device information included in the print setting exists in the storage means, execute print processing for the print data received by the reception unit in accordance with the ID-added device information and the print setting; and display unit adapted to, when the determination means determines that the device information having the ID coincident with the ID of the device information included in the print setting does not exist in the storage means, display paper type information set in the print setting.

In a preferred embodiment, the determination unit determines whether the ID of the device information included in the print setting of the print data received by the reception unit coincides with the ID of the ID-added current device information, and when the ID of the device information included in the print setting does not coincide with the ID of the ID-added current device information, searches IDs of pieces of ID-added previous device information set previously for an ID coincident with the ID of the device information included in the print setting.

According to the fourth aspect of the present invention, a method of controlling an information processing apparatus which generates print data to be printed by an image forming apparatus connected via a network, the method comprises: a reception step of receiving, via the network, ID-added device information which is set in the image forming apparatus and includes paper type information representing a current paper type; a generation step of generating, as a print setting including paper type information for print data to be printed by the image forming apparatus, a print setting having an ID of the ID-added device information received in the reception step; and a transmission step of transmitting, to the image forming apparatus, print data by generating the print data including the print setting generated in the generation step.

According to fifth aspect of the present invention, a method of controlling an image forming apparatus which receives print data from an information processing apparatus connected via a network and executes print processing, the method comprises: a setting step of setting ID-added device information including paper type information representing a current paper type used for print processing; a storage step of storing, in a storage medium, ID-added current device information set in the setting step, and ID-added previous device information set previously; a transmission step of transmitting the ID-added current device information via the network in response to a request from the information processing apparatus; a reception step of receiving print data from the information processing apparatus via the network; a determination step of determining whether device information having an ID coincident with an ID of device information included in a print setting of the print data received in the reception step exists in the storage medium; an execution step of, when the device information having the ID coincident with the ID of the device information included in the print setting is determined in the determination step to exist in the storage medium, executing print processing for the print data received in the reception step in accordance with the ID-added device information and the print setting; and a display step of, when the device information having the ID coincident with the ID of the device information included in the print setting is determined in the determination step not to exist in the storage medium, displaying paper type information set in the print setting.

According to sixth aspect of the present invention, a program, which is stored in a computer-readable medium, for causing a computer to control an information processing apparatus which generates print data to be printed by an image forming apparatus connected via a network, the program causes the computer to execute a reception step of receiving, via the network, ID-added device information which is set in the image forming apparatus and includes paper type information representing a current paper type, a generation step of generating, as a print setting including paper type information for print data to be printed by the image forming apparatus, a print setting having an ID of the ID-added device information received in the reception step, and a transmission step of transmitting, to the image forming apparatus, print data by generating the print data including the print setting generated in the generation step.

According to seventh aspect of the present invention, a program, which is stored in a computer-readable medium, for causing a computer to control an image forming apparatus which receives print data from an information processing apparatus connected via a network and executes print processing, the program causes the computer to execute a setting step of setting ID-added device information including paper type information representing a current paper type used for print processing, a storage step of storing, in a storage medium, ID-added current device information set in the setting step, and ID-added previous device information set previously, a transmission step of transmitting the ID-added current device information via the network in response to a request from the information processing apparatus, a reception step of receiving print data from the information processing apparatus via the network, a determination step of determining whether device information having an ID coincident with an ID of device information included in a print setting of the print data received in the reception step exists in the storage medium, an execution step of, when the device information having the ID coincident with the ID of the device information included in the print setting is determined in the determination step to exist in the storage medium, executing print processing for the print data received in the reception step in accordance with the ID-added device information and the print setting, and a display step of, when the device information having the ID coincident with the ID of the device information included in the print setting is determined in the determination step not to exist in the storage medium, displaying paper type information set in the print setting.

Further features of the present invention will be apparent from the following description of exemplary embodiments with reference to the attached drawings.

BRIEF DESCRIPTION OF THE DRAWINGS

FIG. 8B is a view for explaining an outline of print processing according to the embodiment of the present invention;

FIG. 9A is a table showing the building components of paper type information according to the embodiment of the present invention;

FIG. 9B is a table showing the building components of a paper type information DB according to the embodiment of the present invention;

FIG. 14 is a view showing an example of a paper setup window according to the embodiment of the present invention;

FIG. 15 is a view showing an example of the data structure of a print job according to the embodiment of the present invention;

FIG. 18 is a view for explaining print processing by a conventional print processing system.

DESCRIPTION OF THE EMBODIMENT

A preferred embodiment of the present invention will now be described in detail with reference to the drawings. It should be noted that the relative arrangement of the components, the numerical expressions and numerical values set forth in the embodiment do not limit the scope of the present invention unless it is specifically stated otherwise.

System Configuration

Figure 1:
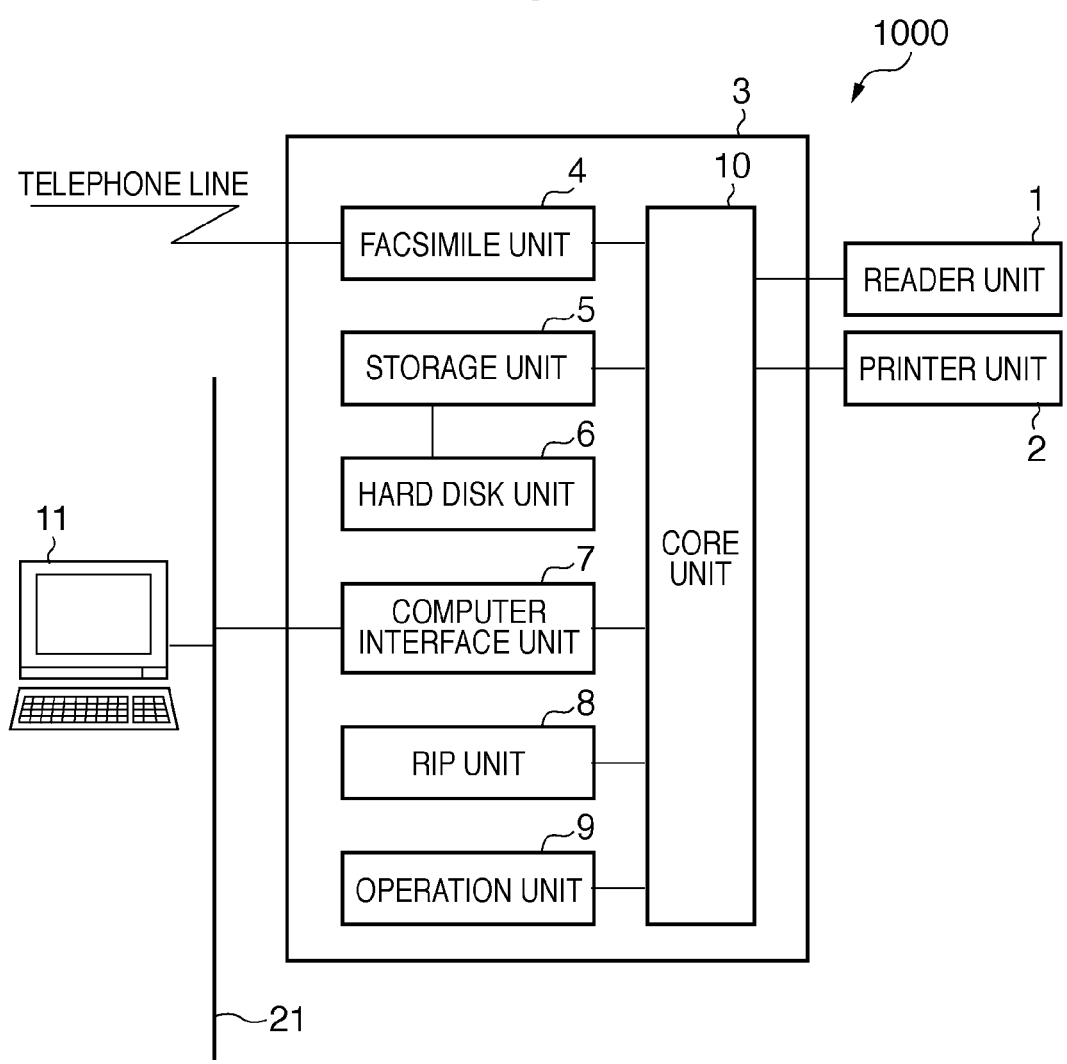
FIG. 1 is a block diagram showing the arrangement of an image input/output apparatus in a print processing system according to an embodiment of the present invention.

FIG. 1 is a block diagram showing the arrangement of an image input/output apparatus in a print processing system according to an embodiment of the present invention.

In an image input/output apparatus 1000, a reader unit 1 reads a document image to output image data corresponding to the document image to an image input/output control unit 3. A printer unit 2 prints, on a print sheet, an image corresponding to the image data from the image input/output control unit 3. The image input/output control unit 3 is connected to the reader unit 1 and printer unit 2, and includes a facsimile unit 4, storage unit 5, hard disk unit 6, computer interface unit 7, RIP (Raster Image Processor) unit 8, operation unit 9, and core unit 10.

The facsimile unit 4 decompresses compressed image data received via a telephone line, and transfers the decompressed image data to the core unit 10. Also, the facsimile unit 4 compresses image data transferred from the core unit 10, and transmits the compressed image data via the telephone line. Image data to be transmitted/received can be temporarily saved in the hard disk unit 6 connected to the storage unit 5.

The storage unit 5 is connected to the hard disk unit 6. The storage unit 5 compresses image data transferred from the core unit 10, and stores the compressed image data in the hard disk unit 6 together with an ID number for searching for the compressed image data. The storage unit 5 searches for compressed image data stored in the hard disk unit 6 on the basis of code data transferred via the core unit 10, reads out and decompresses the detected compressed image data, and transfers the decompressed image data to the core unit 10.

The computer interface unit 7 interfaces a PC (Personal Computer/WS (Work Station): to be simply referred to as a PC hereinafter) 11 serving as an information processing apparatus, and the core unit 10. The computer interface unit 7 is connected to the PC 11 via a network 21. The computer interface unit 7 can communicate with the PC 11 in two ways such that the computer interface unit 7 transmits a print job and paper type information managed by the core unit 10 to the PC 11. The computer interface unit 7 functions as the first transmission unit for transmitting paper type information, and the first reception unit for receiving print data.

Device information on options and the like mounted in the reader unit 1 and printer unit 2, and information on paper set in the paper source (paper feed unit) are transmitted from the reader unit 1 or printer unit 2 to the core unit 10. Information transmitted to the core unit 10 can be transmitted to the PC 11 (functioning as a host computer) via the computer interface unit 7. When the PC 11 transmits a device information acquisition request to the computer interface unit 7 via the network 21, the computer interface unit 7 inquires device information of the core unit 10. The core unit 10 transmits the inquired device information to the PC 11 again via the network 21.

The RIP unit 8 rasterizes code data (PDL), which is transferred from the PC 11 and represents an image, into image data printable by the printer unit 2.

The operation unit 9 includes a touch panel display and hard keys. The operation unit 9 allows the user to make, via a user interface, settings such as an operation instruction and operation setting to the image input/output apparatus 1000, registration of paper type information, and setting of paper information for the paper source. By manipulating the operation unit 9, the user can customize existing paper type information and register device-specific paper type information.

Paper type information input from the operation unit 9 is saved in the storage unit 5. In save, the core unit 10 issues a paper type information ID and paper type ID (to be described later), and finally saves them in the hard disk unit 6 via the storage unit 5 together with paper type information.

The core unit 10 controls data flows between the reader unit 1, the printer unit 2, the facsimile unit 4, the storage unit 5, the computer interface unit 7, the RIP unit 8, and the operation unit 9.

ID-added device information distributed by two-way communication between the PC 11 and the image input/output apparatus 1000 includes the following kinds of information.

For example, the device information includes the types of paper source, delivery device (finisher), and the like, paper type information registered in the image input/output apparatus 1000, paper information set for the paper source, and the remaining toner amount.

The paper type information is customized/registered paper type information (paper type ID, paper name, grammage, surface property, and shape). Paper type information registered and set in the PC 11 is distributed to the image input/output apparatus 1000. For example, the paper type information includes defined Type 1 paper types (e.g., plain paper, glossy paper, thick paper, OHP, recycled paper, and form paper), and customized paper types (Type 2 paper types).

The paper information set for the paper source includes the paper size, paper orientation, and paper type information.

The detailed arrangements of the reader unit 1 and printer unit 2 of the image input/output apparatus 1000 will be explained with reference to FIG. 2.

Figure 2:
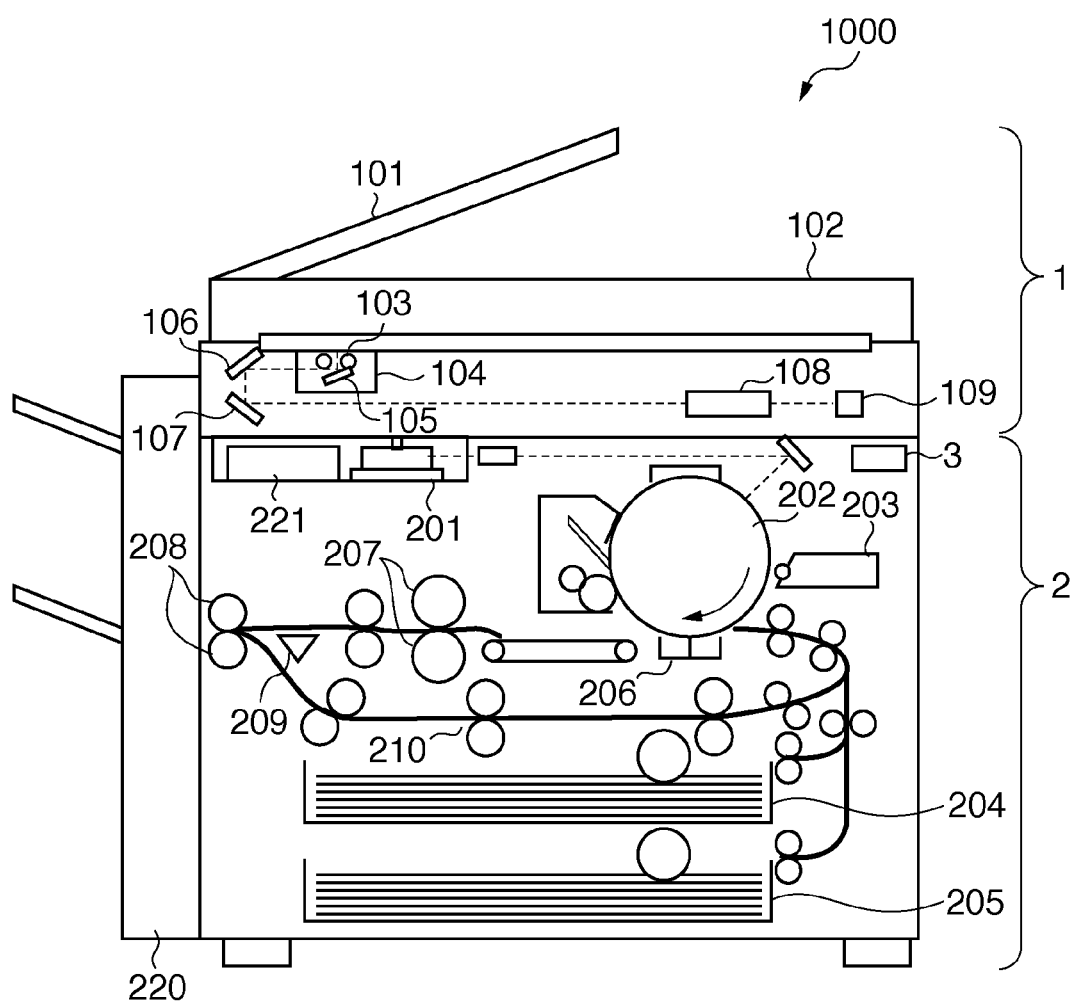
FIG. 2 is a sectional view of a reader unit and printer unit according to the embodiment of the present invention.

FIG. 2 is a sectional view of the reader unit and printer unit according to the embodiment of the present invention.

A document feeder 101 in the reader unit 1 feeds document sheets one by one from the first sheet onto a platen glass 102. After the end of reading the document sheet, the document sheet on the platen glass 102 is discharged onto a discharge device 220. When the document sheet is conveyed onto the platen glass 102, the reader unit 1 turns on a lamp 103, and starts moving a scanner unit 104 to expose and scan the document sheet. Reflected light from the document sheet is guided to a CCD image sensor (to be referred to as a CCD hereinafter) 109 by mirrors 105, 106, and 107 and a lens 108. The image of the scanned document is read by the CCD 109. The image data output from the CCD 109 undergoes predetermined image processing, and then is transferred to the core unit 10 of the image input/output control unit 3.

A laser driver 221 in the printer unit 2 drives a laser emitting unit 201 and causes it to emit a laser beam corresponding to image data output from the core unit 10 of the image input/output control unit 3.

The laser beam irradiates a photosensitive drum 202 to form a latent image corresponding to the laser beam on the photosensitive drum 202. A developing unit 203 applies a developer to the latent image on the photosensitive drum 202. At a timing synchronized with the start of laser beam irradiation, a print sheet is fed from either a cassette 204 or 205 serving as a paper source, and conveyed to a transfer portion 206. The developer applied to the photosensitive drum 202 is transferred onto the print sheet.

The developer-transferred print sheet is conveyed to a fixing portion 207, where the developer is fixed to the print sheet by the heat and pressure of the fixing portion 207. The print sheet having passed through the fixing portion 207 is discharged by discharge rollers 208. When double-sided printing is set, the print sheet is conveyed up to the discharge rollers 208. Then, the discharge rollers 208 rotate backward to guide the print sheet to a refeed conveyance path 210 by a flapper 209. The print sheet guided to the refeed conveyance path 210 is fed to the transfer portion 206 at the above-mentioned timing.

The detailed arrangement of the core unit 10 will be explained with reference to FIG. 3.

Figure 3:
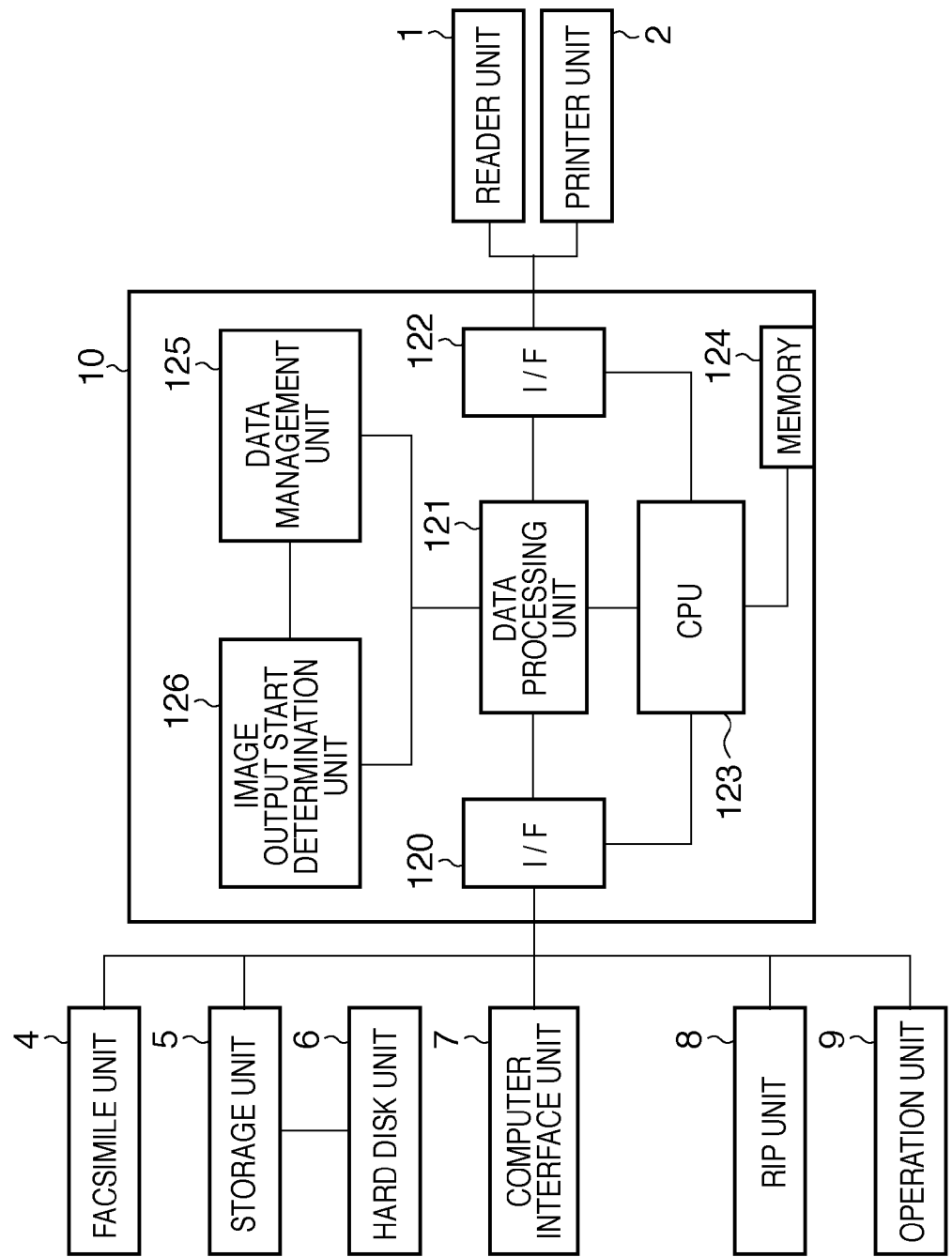
FIG. 3 is a block diagram showing the detailed arrangement of the core unit of the image input/output apparatus according to the embodiment of the present invention.

FIG. 3 is a block diagram showing the detailed arrangement of the core unit of the image input/output apparatus according to the embodiment of the present invention.

Image data from the reader unit 1 is transferred to a data processing unit 121 via an interface (I/F) 122. The data processing unit 121 performs image processes such as image rotation and scaling, and compresses/decompresses image data. The data processing unit 121 incorporates a page memory for a plurality of pages of image data corresponding to the A4/Letter size. Image data transferred from the reader unit 1 to the data processing unit 121 is temporarily stored in the page memory, then compressed, and transferred to the storage unit 5 via an interface (I/F) 120.

Code data (PDL) which is input via the computer interface unit 7 and represents an image is transferred to the data processing unit 121 via the interface 120. The code data is transferred to the RIP unit 8 and rasterized into image data. The image data is transferred to the data processing unit 121, and temporarily stored in a memory 124 functioning as even a page memory. The image data stored in the memory 124 is compressed, transferred to the storage unit 5, and managed by an image data ID number set by the data processing unit 121.

The compressed image data from the storage unit 5 is transferred to the data processing unit 121, decompressed, temporarily stored in the memory 124, and then transferred to the printer unit 2, facsimile unit 4, and computer interface unit 7.

Immediately when the storage unit 5 holds image data, it notifies a data management unit 125 via an image output start determination unit 126 of a message to this effect. The storage unit 5 manages the image data in association with an image data ID number set by the data processing unit 121. At the same time, a print job saved in the hard disk unit 6 is also managed in association with a print job ID number.

It is also possible to input various image data to the data processing unit 121, switch an internal select, and transfer image data temporarily stored in the memory 124 to one of the printer unit 2, facsimile unit 4, and computer interface unit 7.

A CPU 123 executes the above-described control in accordance with a control program stored in the memory 124 and a control command transferred from the operation unit 9. The memory 124 is also used as the work area of the CPU 123.

In this way, processing integrating many functions such as read of a document image, printing of an image, transmission/reception of an image, save of an image, and data input/output to/from the PC 11 can be executed via the data processing unit 121 and storage unit 5 under the control of the core unit 10.

The configuration of a print processing system formed from the PC 11 and image input/output apparatus 1000 will be explained with reference to FIG. 4.

Figure 4:
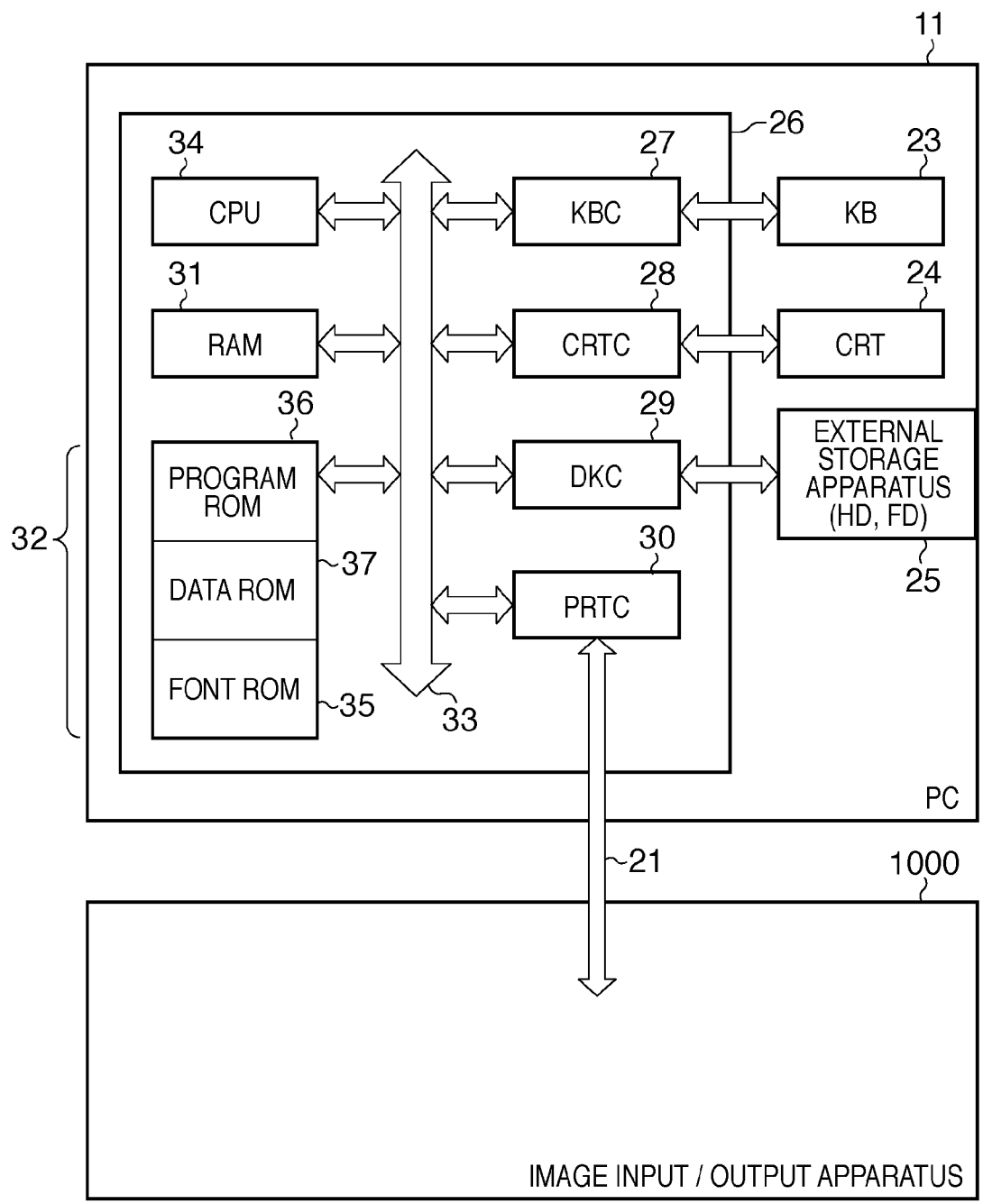
FIG. 4 is a block diagram showing the overall configuration of the print processing system according to the embodiment of the present invention.

FIG. 4 is a block diagram showing the overall configuration of the print processing system according to the embodiment of the present invention.

The image input/output apparatus 1000 is connected to the PC 11 serving as a host computer via the network 21 in order to achieve predetermined two-way communication. The embodiment describes a print processing system in which the image input/output apparatus 1000 and PC 11 are connected via the network 21 so as to be able to communicate with each other.

The PC 11 includes a main unit 26 having various building components, a keyboard (KB) 23, a display unit (CRT) 24, and an external storage apparatus 25.

The KB 23 is manipulated by the operator and receives arbitrary predetermined data. The display unit 24 displays a variety of images such as predetermined data and a UI. The external storage apparatus 25 stores a boot program, various application programs, and various data (e.g., font data, user files, and edit files).

The main unit 26 includes a keyboard controller (KBC) 27, display unit controller (CRTC) 28, disk controller (DKC) 29, printer controller (PRTC) 30, RAM 31, ROM 32, and CPU 34.

The KBC 27 controls key input data from the KB 23, and input data designated with a pointing device (not shown). The CRTC 28 controls the display on the display unit 24. The DKC 29 controls access to the external storage apparatus 25. The PRTC 30 executes communication control processing with the image input/output apparatus 1000. The PRTC 30 functions as the second transmission unit for transmitting print data, and the second reception unit for receiving paper type information. The RAM 31 functions as a work area, temporary save area, and the like. The ROM 32 stores various programs (e.g., a predetermined print control program), data, font data, and the like.

These building elements in the main unit 26 are connected to each other via a system bus 33. The CPU 34 controls the whole main unit 26 via the system bus 33.

The external storage apparatus 25 is not only a hard disk incorporated or mounted in the main body, but also a storage medium such as an FD, CD, CD-R, CD-R/W, MO, DVD, optical disk, or magneto-optical disk. In this case, the DKC 29 is a drive for reading out data from the storage medium.

The ROM 32 includes a font ROM 35, program ROM 36, and data ROM 37. The font ROM 35 stores data such as font data used in document processing. The program ROM 36 stores programs such as a predetermined document processing program and print control program. The data ROM 37 stores various data used to perform document processing.

By using the RAM 31 as a work area, the CPU 34 processes, via a document processing program, a document containing graphics, images, characters, tables (including a spreadsheet), and the like. For example, the CPU 34 rasterizes an outline font into a display data area allocated in the RAM 31. Rasterized bitmap data is displayed on the display unit 24 to enable WYSIWYG (What You See Is What You Get). By rasterizing data while changing the resolution, data displayed on the display unit 24 is directly printed out. The CPU 34 opens various registered windows on the basis of command data designated with the pointing device or KB 23, and executes various data processes.

A dynamic configuration for acquiring current device environment information from the image input/output apparatus 1000 in response to a request from the PC 11 will be explained.

The reader unit 1 and printer unit 2 allow to connect units such as a paper source and delivery device (finisher) as options. Device information including paper information set for the paper source and the remaining toner amount is defined as parameters which change depending on the environment. These pieces of information (device environment information) are transmitted from the reader unit 1 or printer unit 2 to the CPU 123 via the I/F 122, and stored in the memory 124.

Paper type information set and designated from the operation unit 9 is also stored in the memory 124. Upon receiving a device environment information acquisition request from the PC 11 on the network 21 via the computer interface unit 7, the acquisition request is sent to the CPU 123 via the I/F 120. In response to the request, the CPU 123 acquires device environment information serving as device information stored in the memory 124. The device environment information is transmitted to the computer interface unit 7 via the I/F 120 in inverse order from the order of an acquisition request from the PC 11.

A software configuration for implementing print processing with a print data composition function and the like in the PC 11 according to the embodiment will be explained with reference to FIG. 5.

Figure 5:
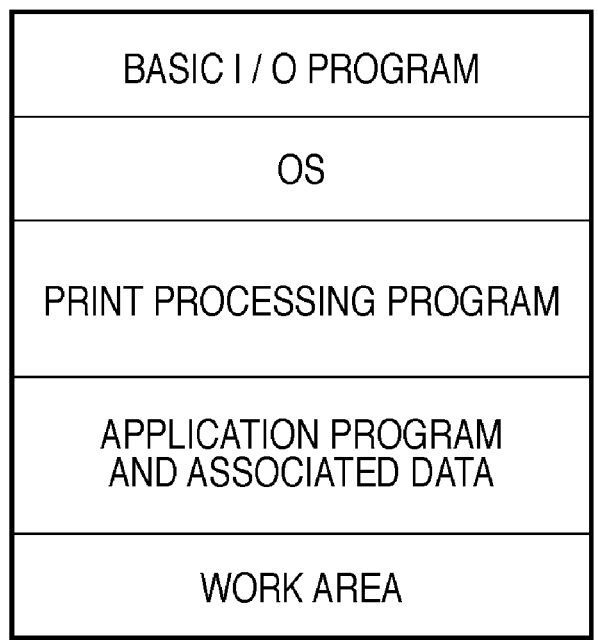
FIG. 5 is a view showing a software configuration in a PC according to the embodiment of the present invention.

FIG. 5 is a view showing a software configuration in the PC according to the embodiment of the present invention.

The PC 11 operates when the CPU 34 executes a basic I/O program, operating system (OS), and print processing program. The basic I/O program is stored in the ROM 32 in the PC 11, and the OS is stored in the external storage apparatus 25 in the PC 11. The external storage apparatus 25 also stores an application program and associated data. A work area for a program is ensured in the RAM 31.

When the PC 11 is turned on, an initial program loading (IPL) function in the basic I/O program runs. The IPL function loads an OS stored in the external storage apparatus 25 in the PC 11 into the RAM 31 in the PC 11, and the OS runs.

Then, the operator uses a command menu displayed on the display unit 24 to designate execution of an application with the KB 23 and pointing device. In response to this, the application program and associated data stored in the external storage apparatus 25 are loaded into the RAM 31, and the application program runs.

If the operator designates print settings or a print instruction by the same procedure as that for activating an application, the print processing program stored in the external storage apparatus 25 is loaded into the RAM 31, and a print processing system implemented by the PC 11 operates. The print processing program provides a printer control command generation program (printer driver).

The configuration (memory map) of the print processing program and associated data contents stored in the external storage apparatus 25 will be explained with reference to FIG. 6.

Figure 6:
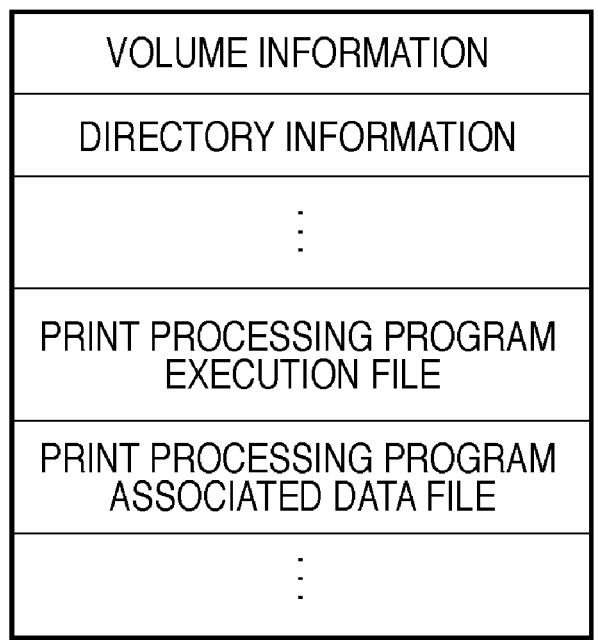
FIG. 6 is a view showing a memory map in an external storage apparatus according to the embodiment of the present invention.

FIG. 6 is a view showing a memory map in the external storage apparatus according to the embodiment of the present invention.

The external storage apparatus 25 has a volume information storage area, directory information storage area, and print processing program execution file area (program for achieving processes shown in various flowcharts to be described later). Further, the external storage apparatus 25 has a print processing-associated data file storage area (e.g., default data of print settings, initial values of print information, and display resources).

When the operator of the PC 11 manipulates the KB 23 to designate installation of the memory contents of the external storage apparatus 25, a desired program and associated data are loaded into the RAM 31 via the DKC 29, and can be executed by the CPU 34.

A module configuration mainly provided by the print processing program in order to perform print processing by the PC 11 for the image input/output apparatus 1000 will be explained with reference to FIG. 7.

Figure 7:
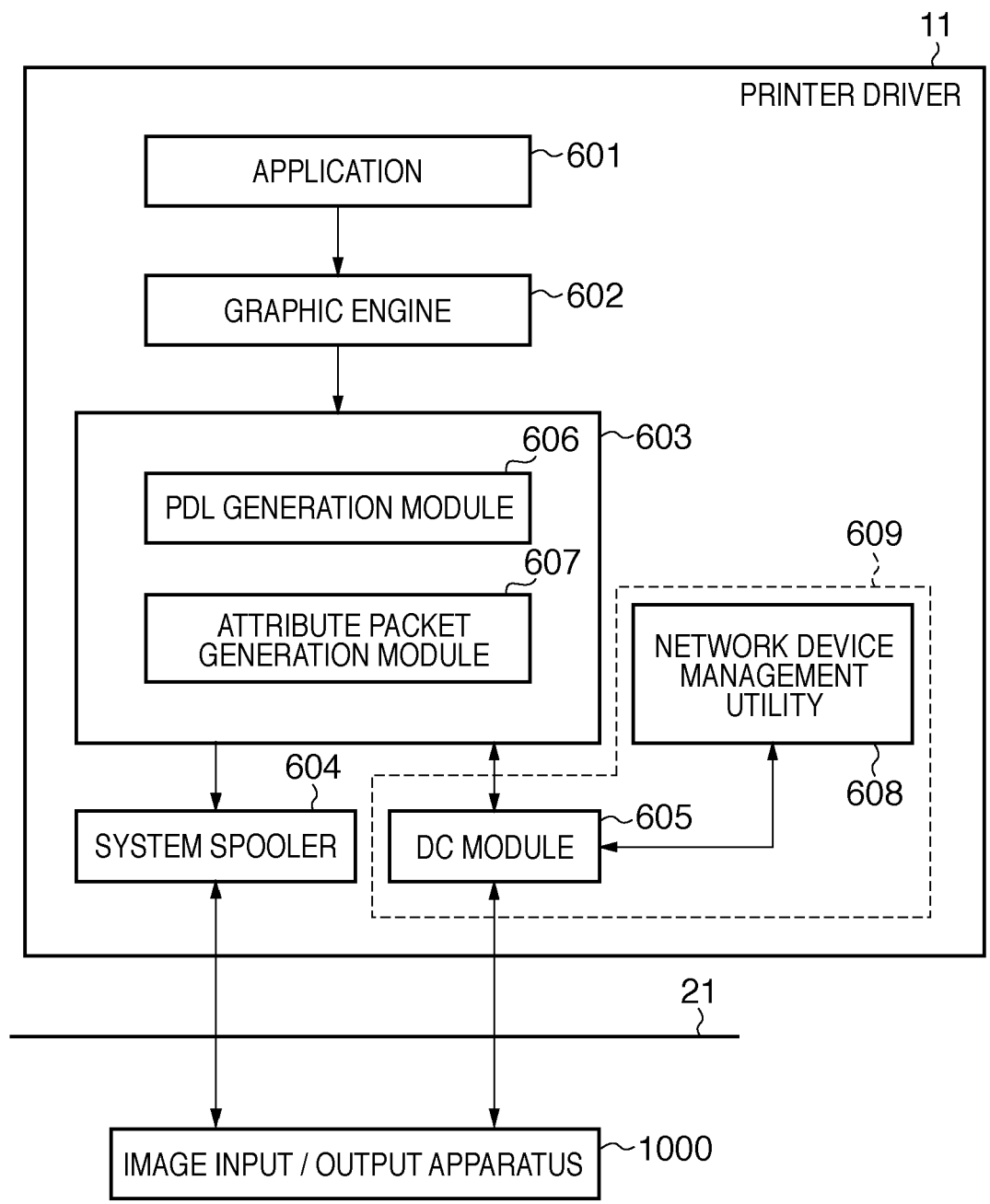
FIG. 7 is a block diagram showing a module configuration implemented in the PC according to the embodiment of the present invention.

FIG. 7 is a block diagram showing a module configuration implemented in the PC according to the embodiment of the present invention.

Modules implemented in the PC 11 include an application 601, graphic engine 602, printer driver 603, system spooler 604, and DC (Dynamic Configuration) module 605. Further, modules implemented in the PC 11 include a PDL generation module 606, attribute packet generation module 607, and network device management utility 608. These modules exist as files saved in the external storage apparatus 25.

These modules are program modules which are loaded into the RAM 31 of the PC 11 in execution by the OS or a module that uses these modules, and executed by the CPU 34.

The application 601 generates a desired document file in response to an operation from the user. The application 601 can output a document file as a rendering function to the graphic engine 602 serving as a rendering unit provided by the OS in accordance with a print instruction from the user.

When the OS is a Windows® (available from Microsoft, USA) OS, the application 601 can acquire the print settings of the printer driver 603 from the DEVMODE structure. There is an application which stores and saves acquired print settings in a created document file. In printer driver initialization processing executed in printing, the print settings saved in the document file are transferred to the printer driver 603 to instruct the printer driver 603 on print settings used to generate the document file.

After the initialization processing, the application 601 coverts the target document file into a rendering function defined by the GDI (Graphical Device Interface) of the OS, and outputs the GUI function serving as the rendering function to the graphic engine 602.

Upon receiving a print start instruction from the application 601, the graphic engine 602 loads the printer driver 603 prepared for each printer into the RAM 31, and sets output of the application 601 in the printer driver 603. The graphic engine 602 converts the GDI function received from the application 601 into a DDI (Device Driver Interface) function, and outputs the DDI function to the printer driver 603.

The printer driver 603 converts the DDI function received from the graphic engine 602 into a printer control command, for example, PDL (Page Description Language) recognizable by the printer. The printer driver 603 generates print data on the basis of the converted printer control command, and outputs it to the computer interface unit 7 via the system spooler 604 loaded by the OS.

The network device management utility 608 is utility software for managing a device connected to the network 21 (e.g., a LAN (Local Area Network)). The network device management utility 608 collects pieces of device information (e.g., statuses and device configuration information) from devices on the network 21 via the DC module 605 (functioning as a device information acquisition module). The network device management utility 608 displays the collected pieces of device information of the devices on the display unit 24 to allow the user to recognize them.

The network device management utility 608 can accept an instruction from the user, and issue various control instructions to devices on the network 21. The control instructions are, for example, job control instructions (e.g., deletion of a print job held in a device on the network 21, suspension, and change of the print order), and device control instructions for changing the IP address of a device on the network 21 and changing various settings.

Upon receiving a device information acquisition instruction from the network device management utility 608, the DC module 605 inquires device information of the computer interface unit 7 via the network 21. When the computer interface unit 7 sends device information to the DC module 605 via the network 21, the DC module 605 sends it back to the network device management utility 608. The DC module 605 is used by the network device management utility 608. A component 609 surrounded by a dotted line is installed at the same time as the network device management utility 608.

The printer driver 603 according to the present invention acquires device information including paper type information from the image input/output apparatus 1000 by using the DC module 605 included in the network device management utility 608. A DC control module (not shown) included in the printer driver 603 can refer to registration information (registry information) in the PC 11 to recognize a location where the DC module 605 is stored.

If necessary, the printer driver 603 requests the DC module 605 to acquire device information. Upon receiving the request from the printer driver 603 (DC control module), the DC module 605 transfers device information acquired from the image input/output apparatus 1000 via the network 21 to the printer driver 603. The device information acquisition request from the printer driver 603 to the DC module 605 includes a device information acquisition instruction, and an instruction which directly designates the printer port or IP address of the image input/output apparatus 1000. Further, the acquisition request includes the function name (instruction which designates the attribute packet generation module 607 of the printer driver 603) of the requesting side.

The printer driver 603 includes not only a function of generating a print instruction, but also the attribute packet generation module 607 (print data generation module) which converts a generated printer control command into packets and generates attribute information-added print data. The printer driver 603 also includes a UI module (not shown) which generates various user interfaces (FIGS. 13 and 14: to be described later) and provides user interface information to the OS. Details of the attribute packet generation module 607 will be described later.

An outline of print processing according to the embodiment of the present invention will be explained with reference to FIGS. 8A and 8B.

Figure 8A:
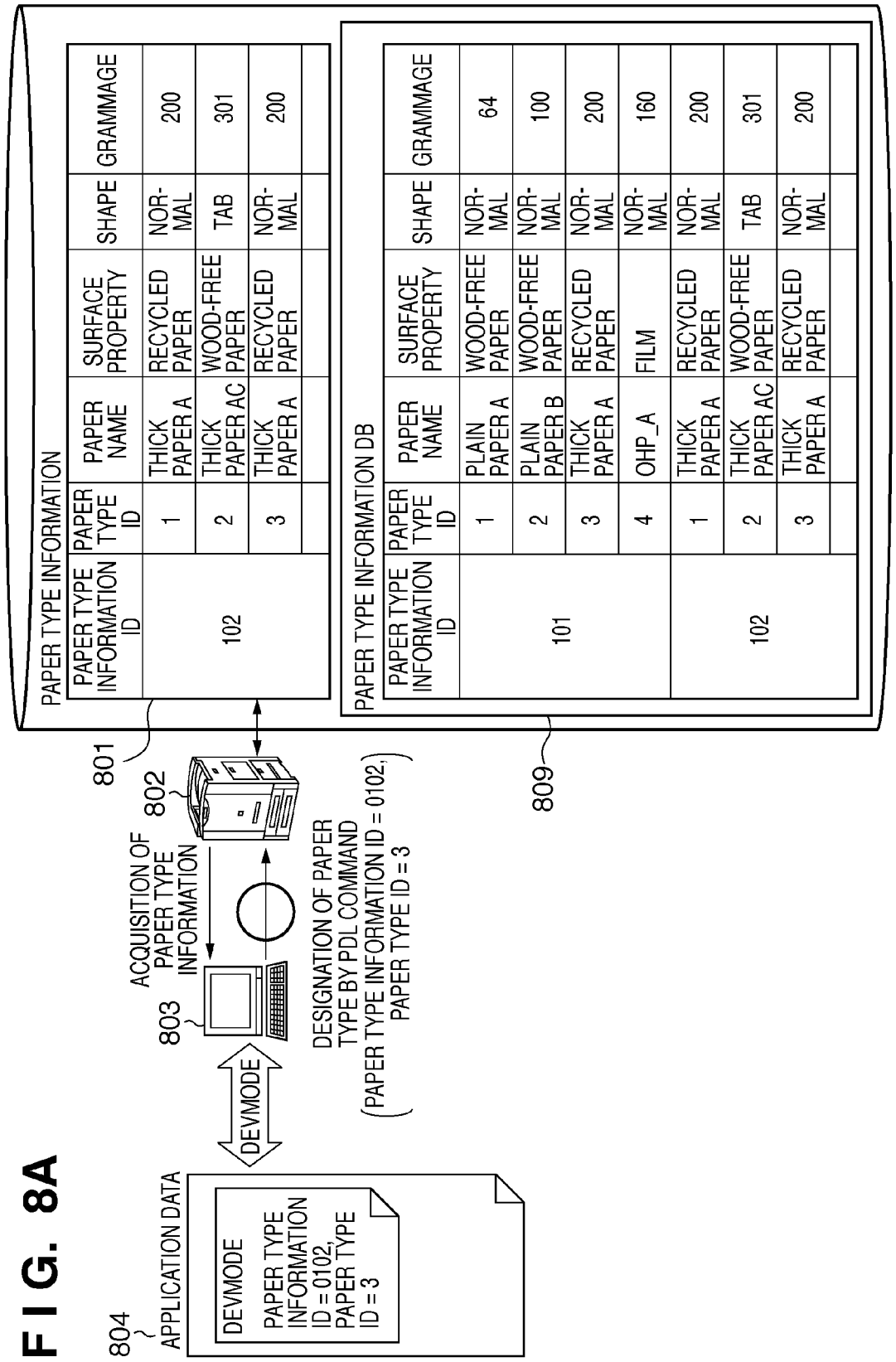
FIG. 8A is a view for explaining an outline of print processing according to the embodiment of the present invention.

FIGS. 8A and 8B are views for explaining an outline of print processing according to the embodiment of the present invention.

In FIG. 8A, Type 2 paper is set as paper type information 801 in a printer 802 corresponding to the image input/output apparatus 1000. The printer 802 has a paper type information DB (DataBase) 809.

The paper type information 801 is current paper type information set in the printer 802, and sent back in response to an inquiry from the PC 11. The paper type information DB 809 saves pieces of paper type information registered previously.

The building components of the paper type information 801 will be explained with reference to FIG. 9A.

FIG. 9A is a table showing the building components of paper type information according to the embodiment of the present invention.

The paper type information 801 is formed from an attribute value 901 representing pieces of paper type information, and a paper type information ID 902.

The attribute value 901 is formed from a paper type ID for each paper type together with various parameters such as the paper name, surface property, shape, and grammage.

The paper type information ID 902 is a number issued when the user newly registers a paper type, or when an existing paper type in the current paper type information 801 is edited. In this manner, according to the present invention, even when editing the paper type information 801, a paper type information ID is issued. Previously set paper type information before editing is saved as old paper type information (previous paper type information) in the paper type information DB 809.

The building components of the paper type information DB 809 will be explained with reference to FIG. 9B.

FIG. 9B is a table showing the building components of the paper type information DB according to the embodiment of the present invention.

The paper type information DB 809 manages created pieces of paper type information 1903 and 1904. The paper type information DB 809 manages a paper type information ID 1902, and paper type information 1901 for each paper type belonging to each paper type information ID.

The embodiment exemplifies the paper type information DB 809 incorporated in the printer 802, but the present invention is not limited to this. For example, a program in a separately arranged server and the printer 802 may communicate with each other to issue a paper type information ID and manage the paper type information DB in the server.

In response to a request from a printer driver installed in a PC 803, the printer 802 transmits the paper type information 801 to the printer driver of the PC 803.

The UI of the printer driver in the PC 803 displays the received paper type information 801 to allow the user to select paper type information. By using, for example, a Win32 API function, an application acquires DEVMODE values storing the print settings of the target printer driver, and saves them in application data 804.

In the embodiment, assume that the paper type selected in the UI of the printer driver is the paper type information ID=102 and the paper type ID=3 (paper name: thick paper A, surface property: recycled paper, shape: normal, grammage: 200). Also assume that the paper type information ID=102 and the paper type ID=3 are registered in the DEVMODE.

Print processing (normal processing system) when printing by a printer having the same paper type information as that used to create the application data 804 will be explained using the PC 803 and printer 802.

An application running in the PC 803 reads the application data 804 and executes print processing by the printer 802. When printing by the printer 802, the printer driver creates a print instruction including a paper type designation instruction from the DEVMODE values (the paper type information ID=102 and the paper type ID=3) received from the application, and transmits the print instruction to the printer 802.

The printer 802 interprets the paper type designation instruction in the received print instruction, and checks a corresponding paper type by referring to the paper type information 801. In this case, a corresponding paper type information ID and paper type ID exist in the paper type information 801, and the printer 802 specifies a paper source having the paper type ID. Based on attribute values in the paper type information 801, the printer 802 can execute appropriate printing by properly performing engine control such as the fixing temperature.

Print processing when printing by a printer having paper type information different from that used to create the application data 804 will be explained using a PC 805 and printer 806 in FIG. 8B.

The operation of a printer driver in the PC 805 is the same as that in the above-described normal processing system. The paper type information ID=102 and the paper type ID=3 are transmitted as a paper type designation instruction in a print instruction to the printer 806. In this case, the paper type information ID=103 exists in paper type information 807 of the printer 806, and does not coincide with the paper type information ID=102 in the print instruction.

In this case, the printer 806 refers to a paper type information DB 808 to search for paper type information having the paper type information ID=102 and the paper type ID=3.

When the corresponding paper type information exists in the paper type information DB 808, the printer 806 specifies a paper source having this paper type ID. When no corresponding paper type exists in the paper type information DB 808, the printer 806 displays a message of necessary paper type information on the operation unit 9 of the printer 806 to present a correct output method to the user.

Processing executed by the image input/output apparatus 1000 will be explained with reference to FIGS. 10 and 11. This processing starts while a program such as an application capable of printing runs in the image input/output apparatus 1000.

Figure 10:
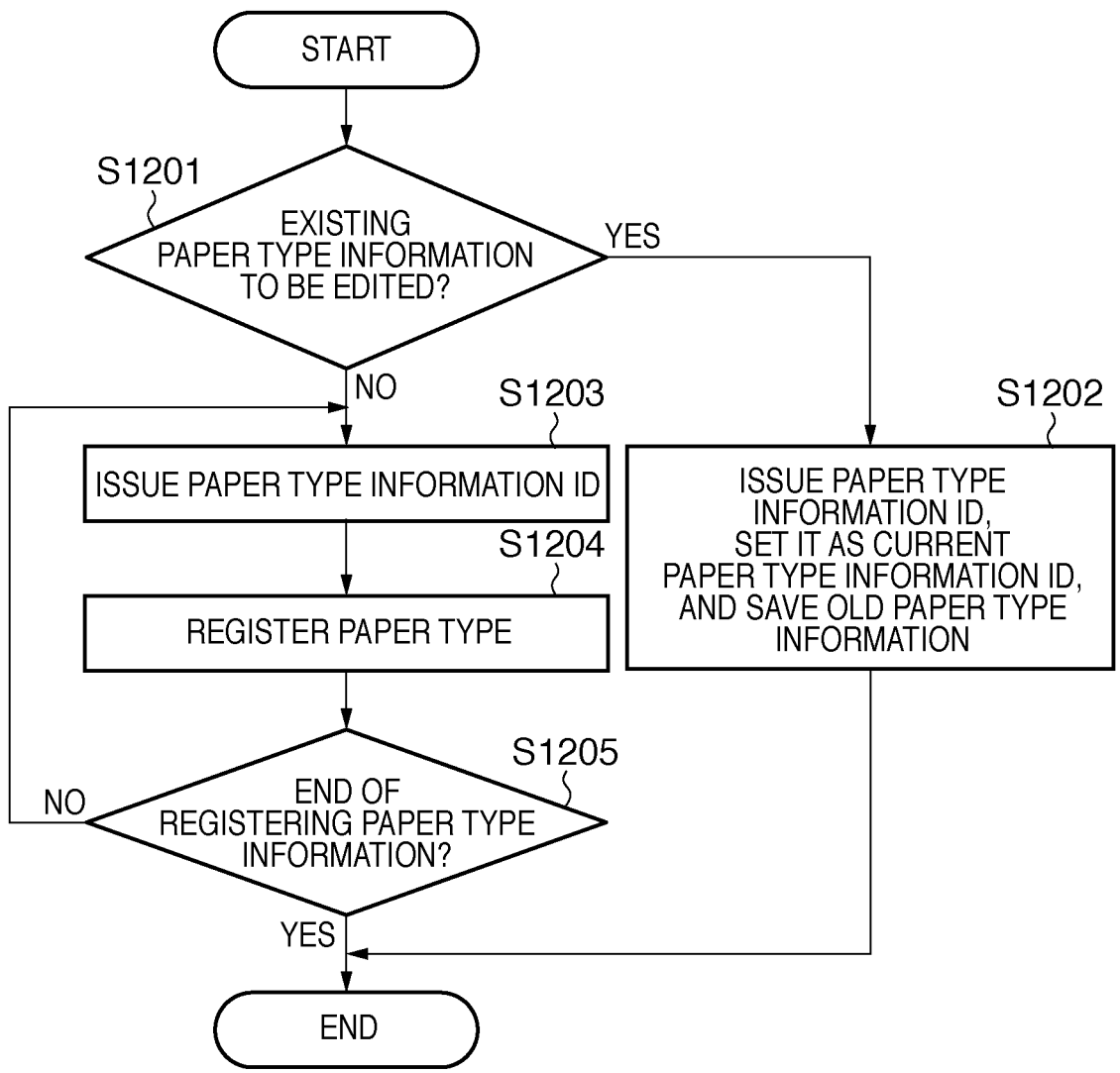
FIG. 10 is a flowchart showing processing by the image input/output apparatus according to the embodiment.
Figure 11:
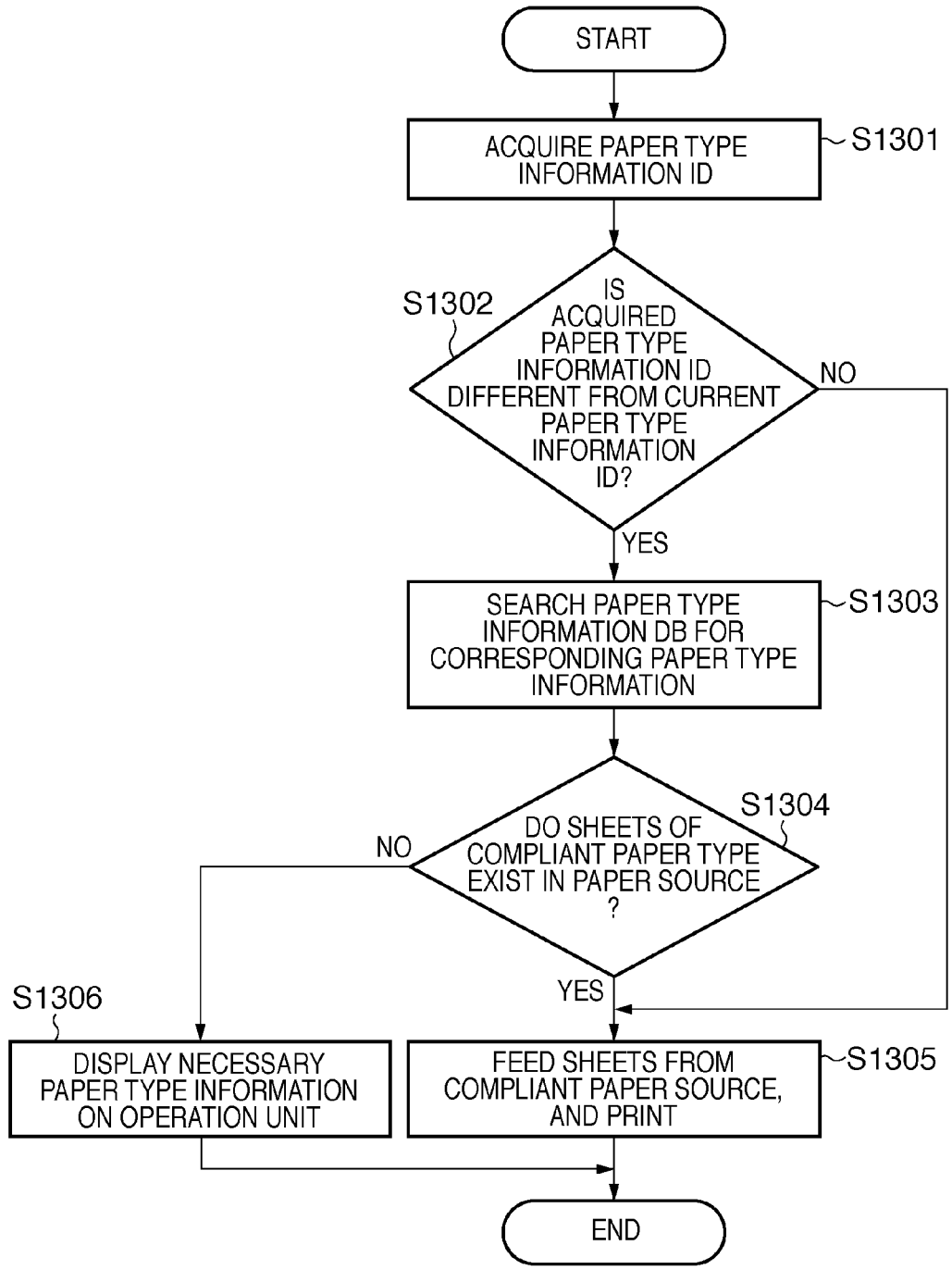
FIG. 11 is a flowchart showing processing of a paper type designation instruction executed by the image input/output apparatus according to the embodiment of the present invention.

FIGS. 10 and 11 are flowcharts showing processes by the image input/output apparatus according to the embodiment.

FIG. 10 shows processing by a program running in the core unit 10 when the user registers or edits a paper type using the operation unit 9 of the image input/output apparatus 1000.

In step S1201, a program running in the core unit 10 determines whether an instruction from the user via the operation unit 9 is an instruction to edit the registered (existing) paper type information 801 or 807 or an instruction to register new paper type information.

If the instruction is to register new paper type information (NO in step S1201), the process advances to step S1203. If the instruction is to edit registered paper type information (YES in step S1201), the process advances to step S1202.

In step S1202, the program running in the core unit 10 saves the registered paper type information as old paper type information together with the paper type information ID in the paper type information DB 809 or 808 in the storage area (hard disk unit 6) of the image input/output apparatus 1000. The program running in the core unit 10 issues a paper type information ID which does not overlap any paper type information ID in the system, and sets it as the current paper type information ID 902 corresponding to the edited paper type information.

In step S1203, the program running in the core unit 10 issues a paper type ID which does not overlap any paper type ID in the current paper type information.

In step S1204, the program running in the core unit 10 additionally registers target paper type information designated by the user via the operation unit 9 in the paper type information together with the paper type ID issued in step S1203.

In step S1205, the program running in the core unit 10 determines whether it has received a paper type information registration end instruction. If the program running in the core unit 10 has not received an end instruction (NO in step S1205), the process returns to step S1203 to execute the same processing for another paper type information to be registered. If the program running in the core unit 10 has received an end instruction (YES in step S1205), the process ends.

Processing of a paper type designation instruction included in a received print instruction that is executed by a program running in the core unit 10 of the image input/output apparatus 1000 will be explained with reference to FIG. 11.

FIG. 11 is a flowchart showing processing of a paper type designation instruction executed by the image input/output apparatus according to the embodiment of the present invention.

In step S1301, the program in the core unit 10 acquires a paper type information ID in a paper type designation instruction included in a received print instruction.

In step S1302, the program in the core unit 10 determines whether the paper type information ID of the current paper type information 801 or 807 is different from the paper type information ID acquired in step S1301. If these two paper type information IDs are different from each other (YES in step S1302), the process advances to step S1303. If these two paper type information IDs coincide with each other (NO in step S1302), the process advances to step S1304.

In step S1303, the program in the core unit 10 refers to the paper type information ID in the paper type information DB 809 or 808 to search for paper type information corresponding to the paper type information ID in the paper type designation instruction.

In step S1304, the program in the core unit 10 determines whether the paper source holds sheets of a paper type corresponding to the paper type information in the paper type designation instruction.

If the paper source holds sheets of the corresponding paper type (YES in step S1304), the process advances to step S1305. The program in the core unit 10 feeds sheets from the compliant paper source, generates a print job in accordance with the received print instruction, and executes printing on the basis of the print job.

If the paper source does not hold sheets of the corresponding paper type (NO in step S1304), the process advances to step S1306. The program in the core unit 10 displays paper type information necessary to print on the operation unit 9, and displays a message which requests the user to feed necessary sheets.

Next, processing to generate a paper type-associated print instruction by the printer driver 603 running in the PC 11 will be explained with reference to FIG. 12.

Figure 12:
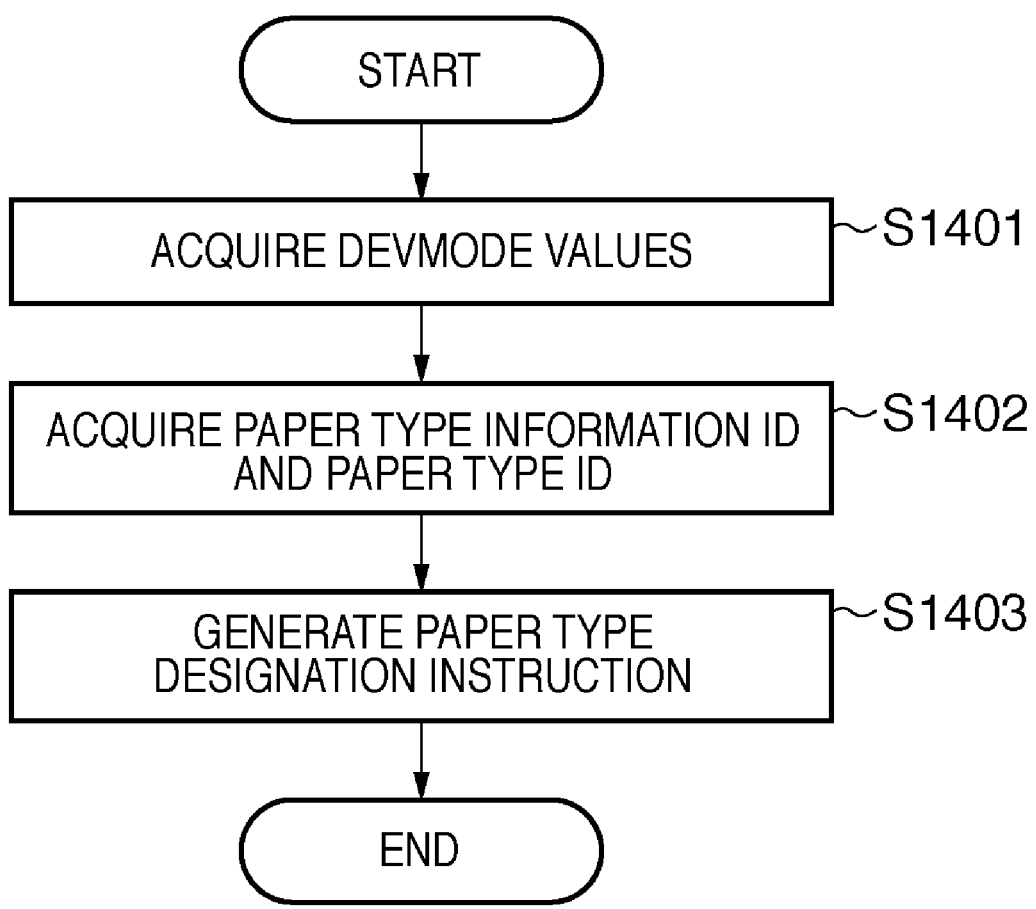
FIG. 12 is a flowchart showing print instruction generation processing executed by the printer driver of the PC according to the embodiment of the present invention.

FIG. 12 is a flowchart showing print instruction generation processing executed by the printer driver of the PC according to the embodiment of the present invention.

In step S1401, the printer driver 603 acquires DEVMODE values via the OS from an application running on the CPU 34 of the PC 11. In step S1402, the printer driver 603 acquires a paper type information ID and paper type ID in the DEVMODE values. In step S1403, the printer driver 603 generates a paper type designation instruction from the acquired paper type information ID and paper type ID.

An example of a UI window generated by the printer driver 603 will be explained with reference to FIGS. 13 and 14.

Figure 13:
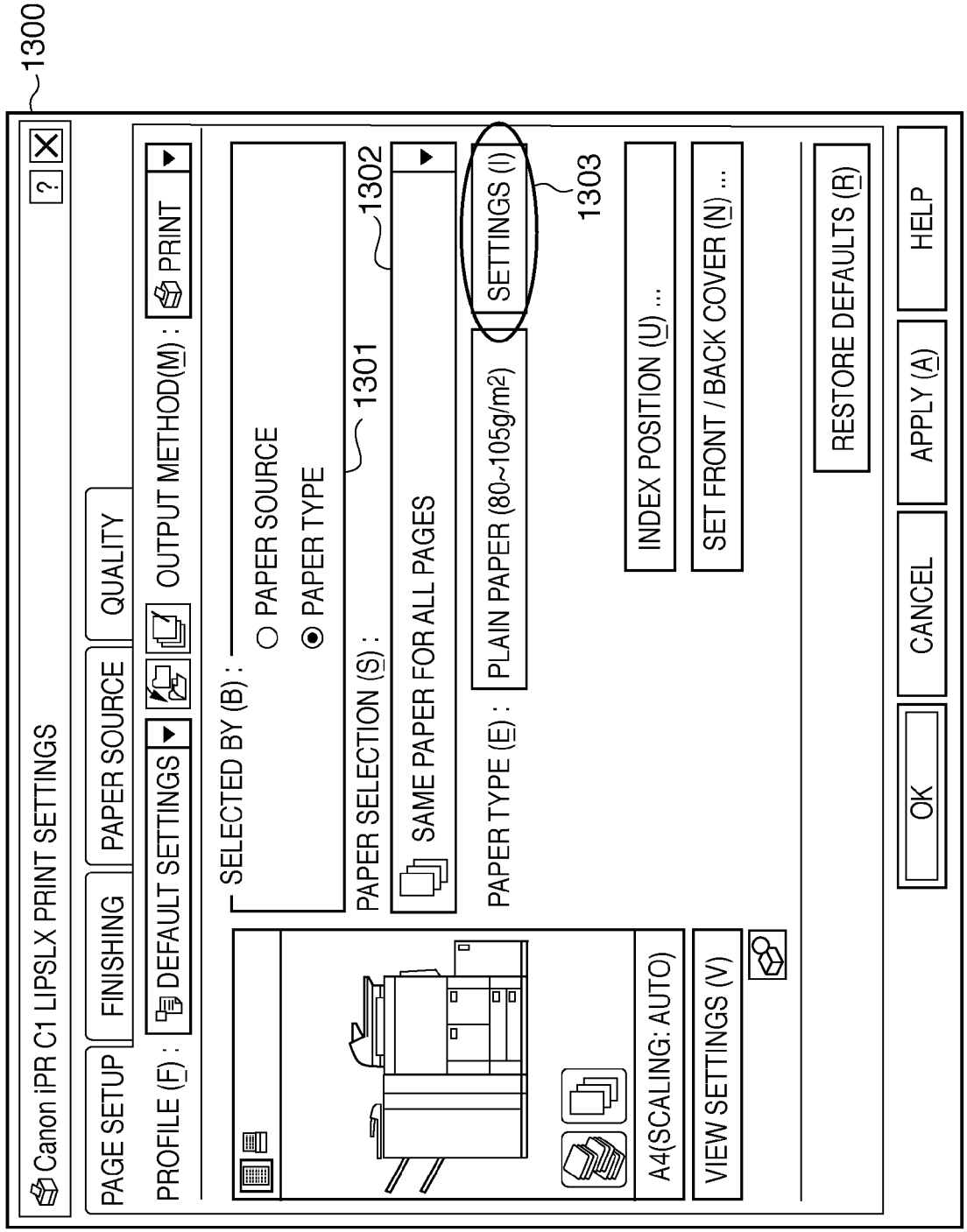
FIG. 13 is a view showing an example of the UI window of a printer driver according to the embodiment of the present invention.

FIGS. 13 and 14 are views showing examples of the UI window of the printer driver according to the embodiment of the present invention.

A UI window 1300 in FIG. 13 is an operation window provided by the printer driver 603 to set a paper selection method and the like. The UI window 1300 is displayed on the display unit 24 when, for example, an application executes printing.

A radio button 1301 is a control for selecting a paper selection method. As the paper selection method, there are two methods: "paper source" for directly designating the paper source of the printer (image input/output apparatus 1000) as a paper supply destination, and "paper type". The paper selection method can be designated by selecting the radio button 1301.

A list box 1302 is a control for prompting the user to select an arbitrary one of paper selection modes. The paper selection modes include, for example, "same paper for all pages" and "different paper sources or different paper types between first and final pages, and pages between them". The paper selection modes also include "different paper sources or different paper types between first, second, and final pages, and pages between them", and "combination of OHP sheets and interleaf sheets".

A button 1303 is a control for displaying a paper setup window for setting a paper type.

In the UI window 1300 of FIG. 13, "paper type" is selected with the radio button 1301, and "same paper for all pages" is selected as the paper selection mode in the list box 1302. If the user presses the button 1303 in this state, a paper setup window 1400 in FIG. 14 appears.

In the paper setup window 1400, a button 1403 is an "acquire paper information" button for designating acquisition of paper type information registered in the image input/output apparatus 1000. A list box 1402 is a control for listing pieces of current paper type information in the image input/output apparatus 1000 that are acquired in response to an instruction from the button 1403, and allowing the user to select a paper type.

Paper type information displayed in the list box 1402 shows information of standard paper types (Type 1) and also information of custom paper types (Type 2) created by the user in the image input/output apparatus 1000. That is, the paper type information displayed in the list box 1402 shows a list of paper types currently set in the image input/output apparatus 1000.

A list box 1401 is a control for switching paper type information displayed in the list box 1402 to a display for each type (Type 1, Type 2, or all).

The structure of a print job serving as a print instruction generated in accordance with paper type information (Type 2) registered in the printer (image input/output apparatus 1000) will be explained with reference to FIG. 15.

FIG. 15 is a view showing an example of the data structure of a print job according to the embodiment of the present invention.

The print job is formed from the blocks of a print job header, paper selection method, paper selection mode, paper type information, rendering data (PDL), and print job termination.

The image input/output apparatus 1000 interprets the contents of a print job transmitted from the PC 11, and can print it with a designated paper selection method and paper selection mode.

The attribute packet generation module 607 of the printer driver 603 generates the block of a print job header serving as the start block of a print job, and those of a paper selection method, paper selection mode, paper type information, and print job termination. The PDL generation module 606 generates rendering data (PDL) in the print job.

The detailed structure of each block in a print job will be explained with reference to FIG. 16.

Figure 16:
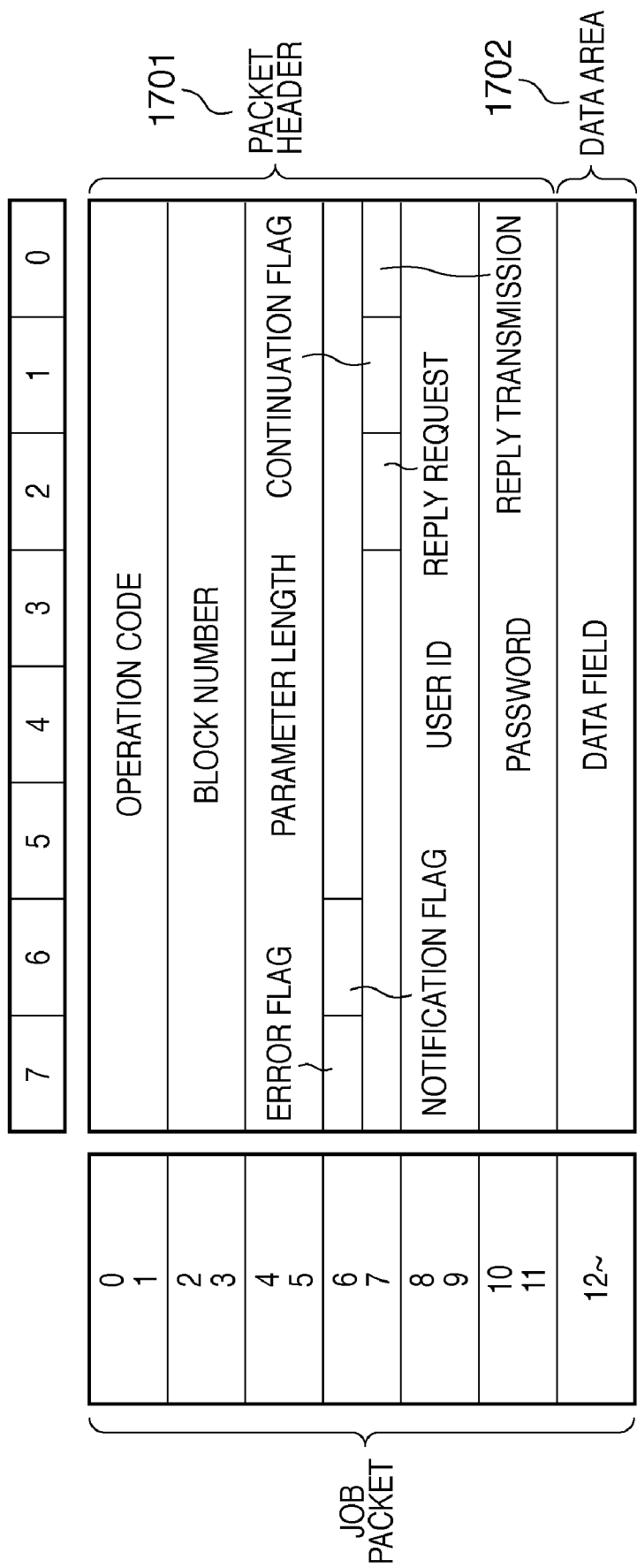
FIG. 16 is a view showing the detailed structure of each block in a print job according to the embodiment of the present invention.

FIG. 16 is a view showing the detailed structure of each block in a print job according to the embodiment of the present invention.

Each block in a print job is divided into a packet header 1701 and data area 1702.

The packet header 1701 is a 12-byte fixed area. The data area 1702 is a variable-size area. The size of the data area 1702 is defined in the packet header 1701.

Referring to FIG. 16, an operation code of the 0th and 1st bytes is a 2-byte ID representing the function of a packet. The operation code can take the following values:

0x0201 job start operation
0x0202 job attribute setting operation
0x0204 PDL data transmission operation
0x0205 job end operation
0x0301 job control operation
0x090a information acquisition operation
"0x" means a hexadecimal number.

In the packet header 1701 of a block corresponding to the "print job header", the operation code takes the value "0201" of the job start operation. In the packet header 1701 of a block corresponding to the "paper selection method", "paper selection mode", or "paper type information", the operation code takes the value "0202" of the job attribute setting operation.

In the packet header 1701 of a block corresponding to the "rendering data (PDL)", the operation code takes the value "0204" of the PDL data transmission operation. In the packet header 1701 of a block corresponding to the "print job termination", the operation code takes the value "0205" of the job end setting operation.

The job control operation is added to the packet header of a job control command to be transmitted from the PC 11 to the image input/output apparatus 1000 in job control. The operation code takes the value "0301" of the job control operation. The job control operation is used when controlling to, for example, delete, suspend, or change in order a print job received in the image input/output apparatus 1000.

The information acquisition operation is added to the packet header of a request command issued from the DC module 605 of the PC 11 to the image input/output apparatus 1000 to acquire device information. The operation code takes the value "090a" of the information acquisition operation.

A block number of the 2nd and 3rd bytes is used to make a request and reply correspond to each other when the job packet transmitting side requests a reply. For example, when the PC 11 successively transmits job packets of the block number=1 to 3 and the image input/output apparatus 1000 sends back an error packet of the block number=2 as a reply, the PC 11 can specify that an error has occurred in the job packet of the block number=2.

A parameter length of the 4th and 5th bytes is an area representing the byte length of a data field from the 12th byte, and can represent 0 to 64 kbytes. The parameter length changes depending on an attribute represented by the packet header.

The 6th and 7th bytes provide an area representing various flags of a job packet, and the flags take the following values.

Error flag: When the value is "1", this means that an error has occurred in the image input/output apparatus 1000. The error flag is added to a reply packet transmitted from the image input/output apparatus 1000 to the PC 11.

Notification flag: When the value is "1", this means that the packet is not a request packet from the PC 11 but the image input/output apparatus 1000 notifies the PC 11 of any notification matter.

Continuation flag: When the value is "1", this means that not all data can be fit in the data area 1702 and the overflowing data are transmitted by the next job packet. The next job packet needs to have the same operation code as that of the preceding packet.

Reply request/reply transmission: "1" is set when the PC 11 requires a reply packet from the image input/output apparatus 1000. When the value is "0", no reply is transmitted in response to a request packet as long as the job is normally processed. When an error occurs in the image input/output apparatus 1000, a reply packet in which the error flag is set to "1" is always transmitted regardless of the value (0 or 1) represented by the reply request.

The 8th and 9th bytes represent a user ID, and the 10th and 11th bytes represent a password. The user ID and password are used for authentication in order to impose a restriction on operations executable by the request packet in terms of security.

The 12th and subsequent bytes provide a data field (attribute value and PDL) corresponding to the operation code. No data exists for the job start operation and job end operation.

For the job attribute setting operation, the job attribute ID and job attribute value are set in the data field. The job attribute ID is an identifier corresponding to an attribute (job attribute) associated with a job, or an environment. An ID which is defined by ISO-10175 (DPA) (ISO: International Organization for Standardization) and corresponds to a job attribute is assigned in advance.

Typical job attributes and job attributes regarding information related to the present invention will be listed:

Job attribute ID
    0x0101 job name
    0x0103 job owner name
    0x016a job size
    0x0a01 paper selection method
    0x0a03 paper selection mode
    0x0a05 paper type information When paper type information of the job attribute ID "0a05" is designated, defined Type 1 values (e.g., plain paper "0", thick paper "1", glossy paper "2", and OHP "4") corresponding to various paper types can be set as job attribute values in the data field. In the present invention, Type 2 values (paper type information ID+paper type ID) defined by the user for a printer can be further set.

For the PDL data transmission operation, PDL data is set in the data field. Data of one job packet can be stored up to 64 kbytes which is a maximum size storable in the above-mentioned parameter length. Data over 64 kbytes is divided into a plurality of PDL data transmission operations and transmitted. In this case, "1" is set in the above-mentioned continuation flag.

For the operation to acquire information generated by the DC module 605, the image input/output apparatus 1000 adds a job attribute ID corresponding to information to be acquired. For example, to acquire paper type information, the job attribute ID is "0a05" which is the same as the above-described job attribute ID of paper type information.

Assume that the image input/output apparatus 1000 receives, from the PC 11, a control packet in which the operation code includes the information acquisition operation ("090a") and the job attribute ID includes paper type information ("0a05"). In this case, the image input/output apparatus 1000 sends back the set paper type information as a control packet to the DC module 605 of the PC 11. The attribute values of the control packet sent back from the image input/output apparatus 1000 include paper type information set in the image input/output apparatus 1000.

A method of generating each block in a print job by the attribute packet generation module 607 or DC module 605 will be explained.

The attribute packet generation module 607 generates the job packet of a print job in print processing. The DC module 605 generates a control packet in acquiring device information.

When the printer driver 603 is activated to start print processing, the attribute packet generation module 607 is also activated. The attribute packet generation module 607 reads print settings made in the UI window of the printer driver 603 from the storage unit (RAM 31 or external storage apparatus 25) in the DEVMODE structure. Some applications transfer DEVMODE values, so the printer driver 603 combines DEVMODE values set in the UI window and DEVMODE values sent from such an application. In general, DEVMODE values received from an application are preferentially used to determine the print settings of a print job.

The attribute packet generation module 607 determines whether the paper selection method designated with the radio button 1301 in the UI window 1300 of FIG. 13 is the first mode "paper source" or the second mode "paper type".

If the attribute packet generation module 607 determines that the paper selection method is the first mode, the attribute value in the data field of the paper selection method block is "0". In this case, the PDL generation module 606 inserts, into PDL in rendering data, a command which designates a paper source, without generating any paper type information block.

If the attribute packet generation module 607 determines that the paper selection method is the second mode, the attribute value in the data field of the paper selection method block is "1". In this case, the attribute packet generation module 607 generates a paper type information block, and inserts, as an attribute value, a value which designates a paper type.

Modules which are configured in the image input/output apparatus 1000 to implement control of the image input/output apparatus 1000 on the basis of data (acquisition request or print job) transmitted from the PC 11 will be explained with reference to FIG. 17.

Figure 17:
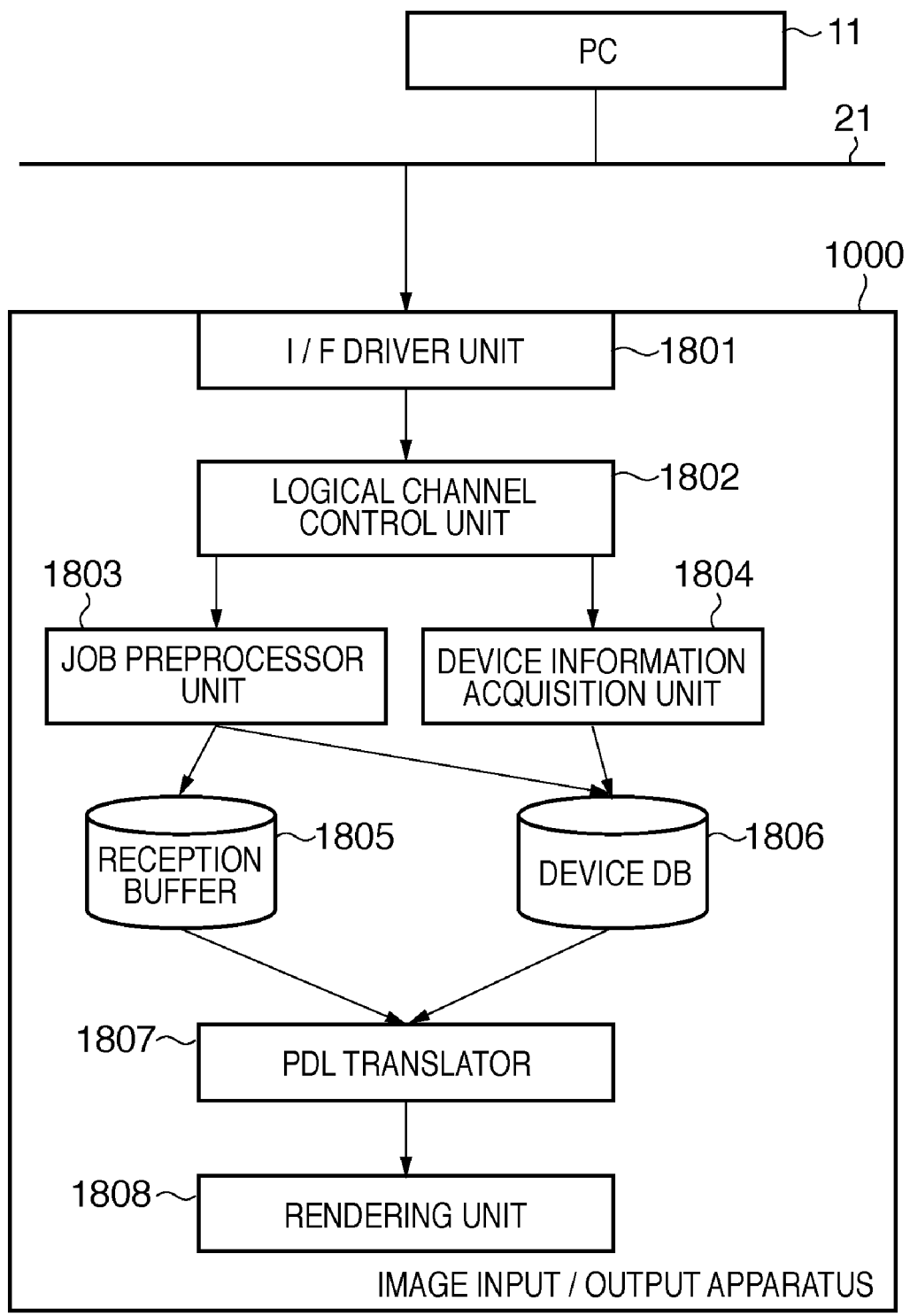
FIG. 17 is a block diagram showing the module configuration of the image input/output apparatus according to the embodiment of the present invention.

FIG. 17 is a block diagram showing the module configuration of the image input/output apparatus according to the embodiment of the present invention.

Modules implemented in the image input/output apparatus 1000 include an I/F driver unit 1801, logical channel control unit 1802, job preprocessor unit 1803, device information acquisition unit 1804, reception buffer 1805, and device DB 1806. Further, modules implemented in the image input/output apparatus 1000 include a PDL translator 1807 and rendering unit 1808.

The I/F driver unit 1801 controls to receive data input from the PC 11 via the network 21, and transmit data to the PC 11 via the network 21.

The logical channel control unit 1802 receives data from the I/F driver unit 1801, and refers to the operation code of the packet of the received data to determine whether the data is a print job or acquisition request control packet. If the logical channel control unit 1802 determines that the received data is a print job, it transmits the data (print job) to the job preprocessor unit 1803. If the logical channel control unit 1802 determines that the received data is a control packet, it transmits the data (control packet) to the device information acquisition unit 1804.

The job preprocessor unit 1803 extracts, from the received print job, only a job attribute packet representing the attribute of the print job. The job preprocessor unit 1803 outputs the job attribute packet to the device DB 1806, and outputs the remaining packets representing print data (PDL) to the reception buffer 1805. In this fashion, the job attribute can be extracted from a print job before analyzing PDL. In the embodiment, the attribute of a received print job and a designated paper type can be recognized without analyzing PDL.

The device information acquisition unit 1804 determines the contents of the operation code from the received control packet. If the operation code represents the information acquisition operation, the device information acquisition unit 1804 performs processing for acquiring device information held in the device DB 1806 or a registered job attribute from the job preprocessor unit 1803.

The device information acquisition unit 1804 determines the job attribute ID of the control packet to determine which information is necessary. When the job attribute ID is "0a05", this means a paper type information acquisition request. The device information acquisition unit 1804 acquires current paper type information held in the device DB 1806, and sends it back as a control packet to the PC 11 via the logical channel control unit 1802.

The PDL translator 1807 acquires print data spooled in the reception buffer 1805 to analyze PDL. The rendering unit 1808 executes print processing to rasterize the print data into raster images in accordance with the analysis result and sequentially print them on print sheets.

As described above, according to the embodiment, the image input/output apparatus functioning as a printer allows to register and edit paper type information in it. When registered paper type information is edited, the image input/output apparatus manages pieces of paper type information before and after editing. When the image input/output apparatus receives an image input/output apparatus device information acquisition request from a PC functioning as a host computer, it transmits device information including paper type information.

The PC makes print settings for application data created by an application on the basis of the acquired device information, and saves them in the application. The PC generates a print job for printing the application data by the image input/output apparatus, and transmits it to the image input/output apparatus.

The image input/output apparatus determines whether paper type information designated in the print job received from the PC is different from current paper type information set in the image input/output apparatus. If the image input/output apparatus determines that these pieces of information are different from each other, it determines whether corresponding paper type information exists in a paper type information DB managed as previous paper type information. If the image input/output apparatus determines that corresponding paper type information exists, it executes print processing in accordance with the corresponding paper type information.

Hence, even if paper type information of the image input/output apparatus differs between creation and printing of application data, appropriate print processing can be executed for the application data on the basis of paper type information before changing the paper type information DB.

That is, when printing application data including print settings made based on device information acquired from the image input/output apparatus, the application data can be printed with the same print settings as those used to create the application data.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-335060 filed on Dec. 26, 2007, which is hereby incorporated by reference herein in its entirety.

What is claimed is:

1. A print processing system configured by connecting, via a network, an information processing apparatus which generates print data, and an image forming apparatus which receives the print data and executes print processing, comprising:

said information processing apparatus comprises
first reception unit adapted to receive, via the network, ID-added device information which is set in said image forming apparatus and includes paper type information representing a current paper type,
generation unit adapted to generate, as a print setting including paper type information for print data to be printed by said image forming apparatus, a print setting having an ID of the ID-added device information received by said first reception unit, and
first transmission unit adapted to transmit, to said image forming apparatus via the network, print data by generating the print data including the print setting generated by said generation unit; and said image forming apparatus comprises
    setting unit adapted to set the ID-added device information including the paper type information,
    storage unit adapted to store ID-added current device information set by said setting unit, and ID-added previous device information set previously,
    second transmission unit adapted to transmit the ID-added current device information via the network in response to a request from said information processing apparatus,
    second reception unit adapted to receive print data from said information processing apparatus via the network,
    determination unit adapted to determine whether device information having an ID coincident with an ID of device information included in a print setting of the print data received by said second reception unit exists in said storage unit,
    execution unit adapted to, when said determination means determines that the device information having the ID coincident with the ID of the device information included in the print setting exists in said storage means, execute print processing for the print data received by said second reception unit in accordance with the ID-added device information and the print setting, and
    display unit adapted to, when said determination means determines that the device information having the ID coincident with the ID of the device information included in the print setting does not exist in said storage means, display paper type information set in the print setting.

2. An information processing apparatus which generates print data to be printed by an image forming apparatus connected via a network, the information processing apparatus comprising:
    reception unit adapted to receive, via the network, ID-added device information which is set in the image forming apparatus and includes paper type information representing a current paper type;
    generation unit adapted to generate, as a print setting including paper type information for print data to be printed by the image forming apparatus, a print setting having an ID of the ID-added device information received by said reception unit; and
    transmission unit adapted to transmit, to the image forming apparatus, print data by generating the print data including the print setting generated by said generation unit.

3. The apparatus according to claim 2, further comprising:
    acquisition unit adapted to acquire, from an application, the print setting which has already been made for application data generated by the application and has the ID of the ID-added device information received by said reception unit; and
    print data generation unit adapted to generate print data including the print setting acquired by said acquisition unit as print data corresponding to the application data.

4. The apparatus according to claim 2, further comprising display unit adapted to display paper type information included in the device information received by said reception unit.

5. An image forming apparatus which receives print data from an information processing apparatus connected via a network and executes print processing, the image forming apparatus comprising:
    setting unit adapted to set ID-added device information including paper type information representing a current paper type used for print processing;
    storage unit adapted to store ID-added current device information set by said setting unit, and ID-added previous device information set previously;
    transmission unit adapted to transmit the ID-added current device information via the network in response to a request from the information processing apparatus;
    reception unit adapted to receive print data from the information processing apparatus via the network;
    determination unit adapted to determine whether device information having an ID coincident with an ID of device information included in a print setting of the print data received by said reception unit exists in said storage unit;
    execution unit adapted to, when said determination means determines that the device information having the ID coincident with the ID of the device information included in the print setting exists in said storage means, execute print processing for the print data received by said reception unit in accordance with the ID-added device information and the print setting; and
    display unit adapted to, when said determination means determines that the device information having the ID coincident with the ID of the device information included in the print setting does not exist in said storage means, display paper type information set in the print setting.

6. The apparatus according to claim 5, wherein said determination unit determines whether the ID of the device information included in the print setting of the print data received by said reception unit coincides with the ID of the ID-added current device information, and when the ID of the device information included in the print setting does not coincide with the ID of the ID-added current device information, searches IDs of pieces of ID-added previous device information set previously for an ID coincident with the ID of the device information included in the print setting.

7. A method of controlling an information processing apparatus which generates print data to be printed by an image forming apparatus connected via a network, the method comprising:
    a reception step of receiving, via the network, ID-added device information which is set in the image forming apparatus and includes paper type information representing a current paper type;
    a generation step of generating, as a print setting including paper type information for print data to be printed by the image forming apparatus, a print setting having an ID of the ID-added device information received in the reception step; and
    a transmission step of transmitting, to the image forming apparatus, print data by generating the print data including the print setting generated in the generation step.

8. A method of controlling an image forming apparatus which receives print data from an information processing apparatus connected via a network and executes print processing, the method comprising:
    a setting step of setting ID-added device information including paper type information representing a current paper type used for print processing;
    a storage step of storing, in a storage medium, ID-added current device information set in the setting step, and ID-added previous device information set previously;

a transmission step of transmitting the ID-added current device information via the network in response to a request from the information processing apparatus;

a reception step of receiving print data from the information processing apparatus via the network;

a determination step of determining whether device information having an ID coincident with an ID of device information included in a print setting of the print data received in the reception step exists in the storage medium;

an execution step of, when the device information having the ID coincident with the ID of the device information included in the print setting is determined in the determination step to exist in the storage medium, executing print processing for the print data received in the reception step in accordance with the ID-added device information and the print setting; and a display step of, when the device information having the ID coincident with the ID of the device information included in the print setting is determined in the determination step not to exist in the storage medium, displaying paper type information set in the print setting.

9. A program, which is stored in a non-transitory computer-readable medium, for causing a computer to control an information processing apparatus which generates print data to be printed by an image forming apparatus connected via a network, the program causing the computer to execute a reception step of receiving, via the network, ID-added device information which is set in the image forming apparatus and includes paper type information representing a current paper type, a generation step of generating, as a print setting including paper type information for print data to be printed by the image forming apparatus, a print setting having an ID of the ID-added device information received in the reception step, and a transmission step of transmitting, to the image forming apparatus, print data by generating the print data including the print setting generated in the generation step.

10. A program, which is stored in a non-transitory computer-readable medium, for causing a computer to control an image forming apparatus which receives print data from an information processing apparatus connected via a network and executes print processing, the program causing the computer to execute a setting step of setting ID-added device information including paper type information representing a current paper type used for print processing, a storage step of storing, in a storage medium, ID-added current device information set in the setting step, and ID-added previous device information set previously, a transmission step of transmitting the ID-added current device information via the network in response to a request from the information processing apparatus, a reception step of receiving print data from the information processing apparatus via the network, a determination step of determining whether device information having an ID coincident with an ID of device information included in a print setting of the print data received in the reception step exists in the storage medium, an execution step of, when the device information having the ID coincident with the ID of the device information included in the print setting is determined in the determination step to exist in the storage medium, executing print processing for the print data received in the reception step in accordance with the ID-added device information and the print setting, and a display step of, when the device information having the ID coincident with the ID of the device information included in the print setting is determined in the determination step not to exist in the storage medium, displaying paper type information set in the print setting.

* * * * *